(12) United States Patent
Monma et al.

(10) Patent No.: US 11,642,878 B2
(45) Date of Patent: May 9, 2023

(54) LAMINATING DEVICE, IMAGE FORMING APPARATUS, AND IMAGE FORMING SYSTEM

(71) Applicants: Shinya Monma, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Joji Akiyama, Kanagawa (JP); Yohsuke Haraguchi, Kanagawa (JP); Wataru Nozaki, Kanagawa (JP); Suzuka Fujita, Kanagawa (JP)

(72) Inventors: Shinya Monma, Kanagawa (JP); Tomohiro Furuhashi, Kanagawa (JP); Wataru Takahashi, Tokyo (JP); Sho Asano, Kanagawa (JP); Yoshito Suzuki, Chiba (JP); Joji Akiyama, Kanagawa (JP); Yohsuke Haraguchi, Kanagawa (JP); Wataru Nozaki, Kanagawa (JP); Suzuka Fujita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/591,245

(22) Filed: Feb. 2, 2022

(65) Prior Publication Data

US 2022/0288910 A1    Sep. 15, 2022

(30) Foreign Application Priority Data

Mar. 12, 2021 (JP) .............................. JP2021-040086

(51) Int. Cl.
*B32B 37/00* (2006.01)
*B32B 41/00* (2006.01)
(Continued)

(52) U.S. Cl.
CPC ........ *B32B 37/0053* (2013.01); *B32B 37/226* (2013.01); *B32B 41/00* (2013.01); *B65H 5/302* (2013.01); *B32B 2037/0069* (2013.01)

(58) Field of Classification Search
CPC ... B32B 37/0053; B32B 37/226; B32B 41/00; B32B 2037/0069; B65H 5/302;
(Continued)

(56) References Cited

U.S. PATENT DOCUMENTS 5,217,561 A * 6/1993 Ueda ................... B32B 38/0036
219/508
6,893,521 B2 * 5/2005 Sasaki ................... B32B 37/185
156/367
(Continued)

FOREIGN PATENT DOCUMENTS

| JP | 9-150456 | 6/1997 |
|----|----------|--------|
| JP | 9-164593 | 6/1997 |

(Continued)

*Primary Examiner* — Francisco W Tschen
*Assistant Examiner* — Abhishek A Patwardhan
(74) *Attorney, Agent, or Firm* — Harness Dickey & Pierce, P.L.C.

(57) ABSTRACT

A laminating device inserts a sheet-shaped medium into a two-ply sheet in which two sheets are overlaid and partially bonded, and includes a loader, a fixing device, and control circuitry. The loader loads the sheet-shaped medium or a cleaning sheet. The fixing device laminates the two-ply sheet in which the sheet-shaped medium is sandwiched between the two sheets of the two-ply sheet. The control circuitry performs a cleaning mode of conveying a plurality of cleaning sheets from the loader to clean the fixing device. The cleaning mode is to convey a subsequent cleaning sheet of the plurality of cleaning sheets at a position different from a position of a preceding cleaning sheet of the plurality of (Continued)

cleaning sheets in a direction orthogonal to a conveyance direction of the plurality of cleaning sheets.

16 Claims, 25 Drawing Sheets

(51) Int. Cl.
*B65H 5/30* (2006.01)
*B32B 37/22* (2006.01)

(58) Field of Classification Search
CPC ....... B65H 2301/531; B08B 1/02; B08B 1/00; B08B 1/001; B41F 19/001; B41F 19/00; G03G 2215/00531; G03G 2215/6567
See application file for complete search history.

(56) References Cited

U.S. PATENT DOCUMENTS

| | | | |
|---|---|---|---|
| 7,946,326 B2* | 5/2011 | Lee | B65H 5/305 |
| | | | 156/367 |
| 2005/0079968 A1* | 4/2005 | Trovinger | B65H 45/142 |
| | | | 493/356 |
| 2009/0039593 A1 | 2/2009 | Kikkawa et al. | |
| 2011/0103921 A1 | 5/2011 | Suzuki et al. | |
| 2011/0248440 A1 | 10/2011 | Sugiyama et al. | |
| 2012/0267846 A1 | 10/2012 | Nakada et al. | |
| 2015/0031520 A1 | 1/2015 | Nakada et al. | |
| 2016/0257100 A1* | 9/2016 | Tachibana | B32B 37/0053 |
| 2016/0340145 A1 | 11/2016 | Kunieda et al. | |
| 2017/0021603 A1* | 1/2017 | Kikuchi | B32B 37/182 |
| 2019/0284012 A1 | 9/2019 | Yoneyama et al. | |
| 2020/0247636 A1 | 8/2020 | Furuhashi et al. | |
| 2020/0341414 A1 | 10/2020 | Watanabe et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |
| 2021/0253385 A1 | 8/2021 | Suzuki et al. | |
| 2021/0289090 A1 | 9/2021 | Monma et al. | |
| 2021/0294249 A1 | 9/2021 | Takahashi et al. | |
| 2021/0325804 A1 | 10/2021 | Furuhashi et al. | |
| 2021/0333730 A1 | 10/2021 | Asano et al. | |
| 2021/0347160 A1 | 11/2021 | Akiyama et al. | |
| 2021/0347589 A1 | 11/2021 | Suzuki et al. | |
| 2021/0354948 A1 | 11/2021 | Takahashi et al. | |
| 2021/0356899 A1 | 11/2021 | Takahashi et al. | |

FOREIGN PATENT DOCUMENTS

| | | |
|---|---|---|
| JP | 2003-131524 | 5/2003 |
| JP | 2006-160429 | 6/2006 |
| JP | 2020-121868 | 8/2020 |

* cited by examiner

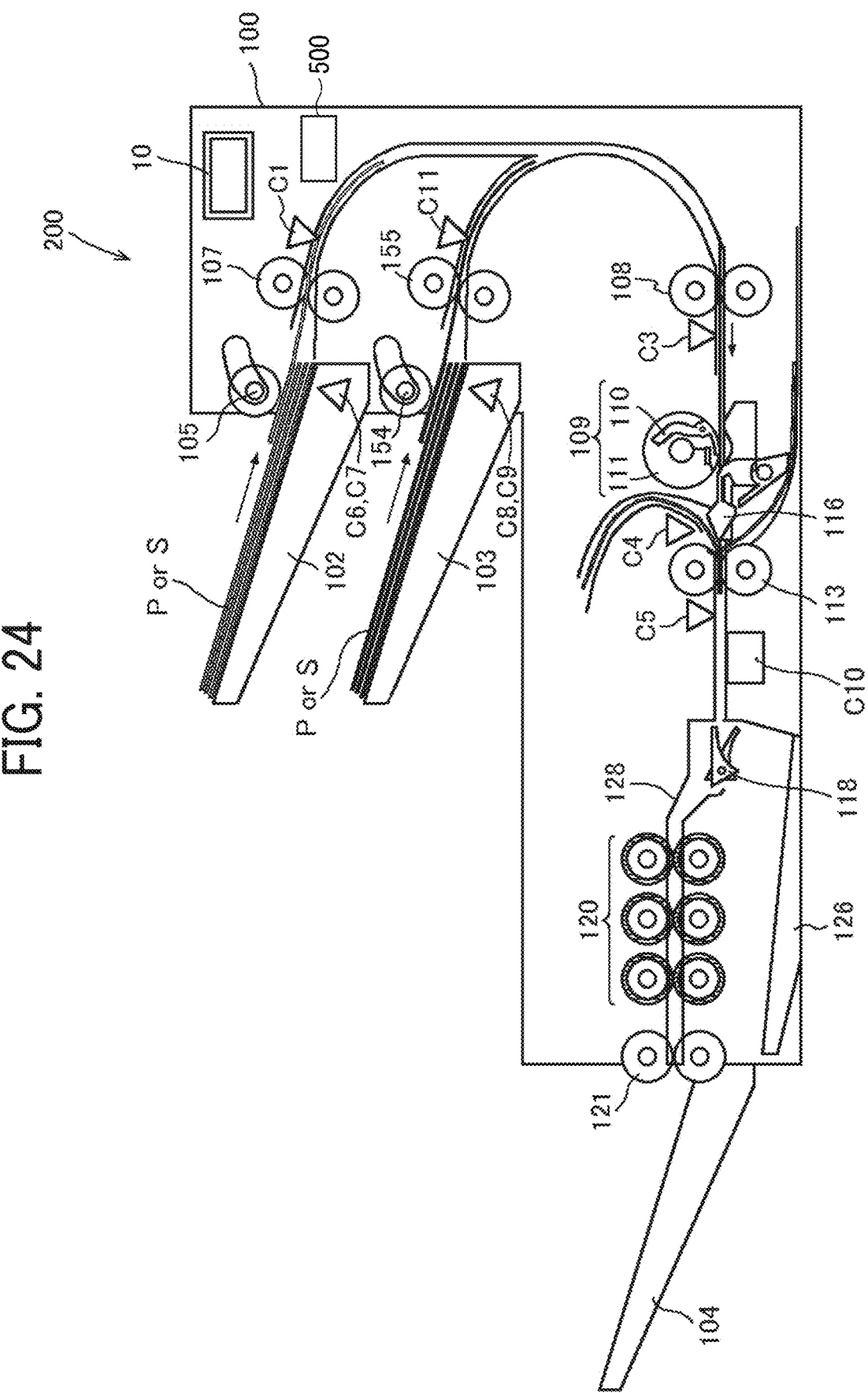

| FIG. 28A |
| FIG. 28B |

- FIG. 29A
- FIG. 29B

LAMINATING DEVICE, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-040086, filed on Mar. 12, 2021, in the Japan Patent Office, the entire disclosure of which is incorporated by reference herein.

BACKGROUND

Technical Field

Embodiments of the present disclosure relate to a laminating device, an image forming apparatus, and an image forming system.

Related Art

Lamination technologies have been proposed that insert an inner sheet (e.g., paper or photo) between a two-ply sheet or lamination film (e.g., a lamination pouch or lamination folder) and apply heat and pressure to the two-ply sheet to bond the two-ply sheet. The two-ply sheet is made of two sheets (plies) bonded (sealed) on one side as if one sheet is folded.

SUMMARY

In an embodiment of the present disclosure, there is provided a laminating device that inserts a sheet-shaped medium into a two-ply sheet in which two sheets are overlaid and partially bonded, and includes a loader, a fixing device, and control circuitry. The loader loads the sheet-shaped medium or a cleaning sheet. The fixing device laminates the two-ply sheet in which the sheet-shaped medium is sandwiched between the two sheets of the two-ply sheet. The control circuitry performs a cleaning mode of conveying a plurality of cleaning sheets from the loader to clean the fixing device. The cleaning mode is to convey a subsequent cleaning sheet of the plurality of cleaning sheets at a position different from a position of a preceding cleaning sheet of the plurality of cleaning sheets in a direction orthogonal to a conveyance direction of the plurality of cleaning sheets.

In another embodiment of the present disclosure, there is provided an image forming apparatus that includes the laminating device.

In still another embodiment of the present disclosure, there is provided an image forming system that includes the laminating device.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 24 is a schematic diagram illustrating an overall configuration of a laminating device including a sheet processing device according to an embodiment of the present disclosure;

Figure 1:
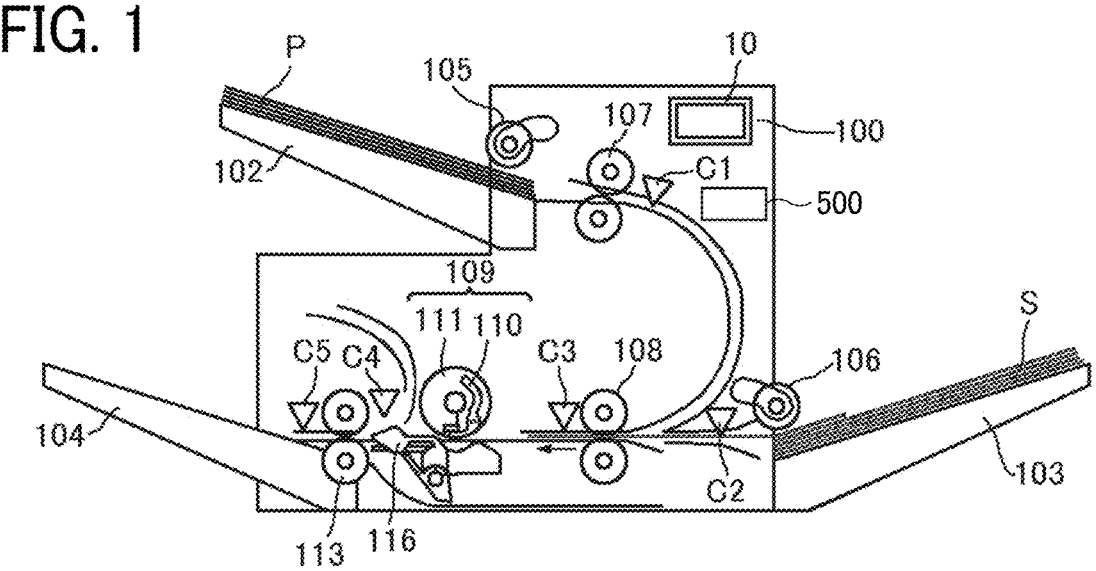
FIG. 1 is a schematic diagram illustrating a general arrangement of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic diagram illustrating a general arrangement of a sheet processing device according to an embodiment of the present disclosure. A sheet processing device 100 according to the present embodiment separates two sheets (plies) of a two-ply sheet (hereinafter referred to as a lamination sheet S) to insert and sandwich a sheet-shaped medium (hereinafter referred to as an inner sheet P) between the separated sheets of the lamination sheet S.

The lamination sheet S is the two-ply sheet in which two sheets are overlapped and bonded together at a portion (or a side) of the two-ply sheet. For example, there is a two-ply sheet in which a first side as a transparent sheet such as a transparent polyester sheet and a second side facing the first side as a transparent or opaque sheet are bonded at one side of the two-ply sheet. Examples of the two-ply sheet also include a lamination film.

The inner sheet P is an example of the sheet-shaped medium that is inserted into the two-ply sheet. The sheet-shaped medium may be, for example, thick paper, a postcard, an envelope, plain paper, thin paper, coated paper, art paper, tracing paper, and an overhead projector (OHP) transparency.

As illustrated in FIG. 1, the sheet processing device 100 includes a sheet feed tray 102 as a first loader on which the inner sheets P are loaded, a pickup roller 105 that feeds the inner sheets P one at a time from the sheet feed tray 102, a conveying roller pair 107, and a sheet conveyance passage defined by some inner components of the sheet processing device 100 to reverse the inner sheet P. The sheet processing device 100 further includes a sheet feed tray 103 as a second loader on which the lamination sheets S are loaded, and a pickup roller 106 that feeds the lamination sheets S one at a time from the sheet feed tray 103.

The sheet processing device 100 has a sheet feed passage and a sheet conveyance passage that are different from each other. In order to enhance productivity, the sheet processing device 100 conveys the lamination sheet S in the shortest distance through a straight passage for conveying the lamination sheet S to be separated. Since it is necessary for the inner sheet P to wait until a separating operation of the lamination sheet S is completed, the inner sheet P is fed in advance separately from the lamination sheet S and stands by in the sheet conveyance passage that allows the inner sheet P to be reversed and that ensures a standby distance.

In order to reduce in size and enhance productivity, a passage for lamination sheet conveyance from the pickup roller 106 to an entrance roller pair 108 is shorter than the passage for inner sheet conveyance from the pickup roller 105 to the entrance roller pair 108. The passages meet upstream from the entrance roller pair 108.

The lamination sheet S into which the inner sheet P has been inserted is ejected onto a sheet ejection tray 104 by an exit roller pair 113 or a roller disposed downstream from the exit roller pair 113. Thus, the lamination sheets S lie stacked on the sheet ejection tray 104. The sheet conveyance passage to reverse the inner sheet P allows the inner sheets P to be ejected and stacked on the sheet ejection tray 104 in the order of the inner sheets P stacked on the sheet feed tray 102.

A conveyance sensor C1 is disposed downstream from the conveying roller pair 107 in a sheet conveyance direction to detect a sheet conveyance position of the inner sheet P. A conveyance sensor C2 is disposed downstream from the pickup roller 106 in the sheet conveyance direction to detect the sheet conveyance position of the lamination sheet S. Note that the sheet conveyance position of the lamination sheet S is a position of the lamination sheet S conveyed. Similarly, the sheet conveyance position of the inner sheet P is a position of the inner sheet P conveyed.

The sheet processing device 100 includes the entrance roller pair 108 as a first conveyor, a winding roller 109 as a rotator, the exit roller pair 113 as a second conveyor, and the sheet ejection tray 104. The entrance roller pair 108, the winding roller 109, the exit roller pair 113, and the sheet ejection tray 104 are disposed downstream from the conveying roller pair 107 and the pickup roller 106 in the sheet conveyance direction. The sheet processing device 100 further includes a separation claw 116 between the winding roller 109 and the exit roller pair 113. The separation claw 116 is movable in a width direction of the lamination sheet S. The separation claw 116 serves as a separator that separates the lamination sheet S according to the present embodiment.

A conveyance sensor C3 that detects the sheet conveyance positions of the lamination sheet S and the inner sheet P is disposed downstream from the entrance roller pair 108 in the sheet conveyance direction. An abnormality detection sensor C4 that detects the condition of the lamination sheet S is disposed downstream from the winding roller 109 in the sheet conveyance direction. A conveyance sensor C5 that detects the sheet conveyance position of the lamination sheet S is disposed downstream from the exit roller pair 113 in the sheet conveyance direction.

The pickup roller 105, the conveying roller pair 107, the entrance roller pair 108, and the winding roller 109 are examples of a first feeder. The pickup roller 106, the entrance roller pair 108, and the winding roller 109 are examples of a second feeder.

An operation panel 10 is disposed on an exterior of the sheet processing device 100. The operation panel 10 serves as a display-operation device to display data of the sheet processing device 100 and receives input of the operation of the sheet processing device 100.

The operation panel 10 also serves as a notification device to output a perceptual signal to a user. Note that, as an alternative, a notification device other than the operation panel 10 may be separately disposed in the sheet processing device 100.

The sheet processing device 100 according to the present embodiment loads the lamination sheets S and the inner sheets P on separate trays. As the lamination sheet S is conveyed in the sheet processing device 100, the sheet processing device 100 separates and opens the lamination sheet S into two sheets and inserts the inner sheet P into an opening of the lamination sheet S. The exit roller pair 113 ejects the lamination sheet S, in which the inner sheet P has been inserted, onto the sheet ejection tray 104. Thus, the lamination sheets S lie stacked on the sheet ejection tray 104.

Figure 2:
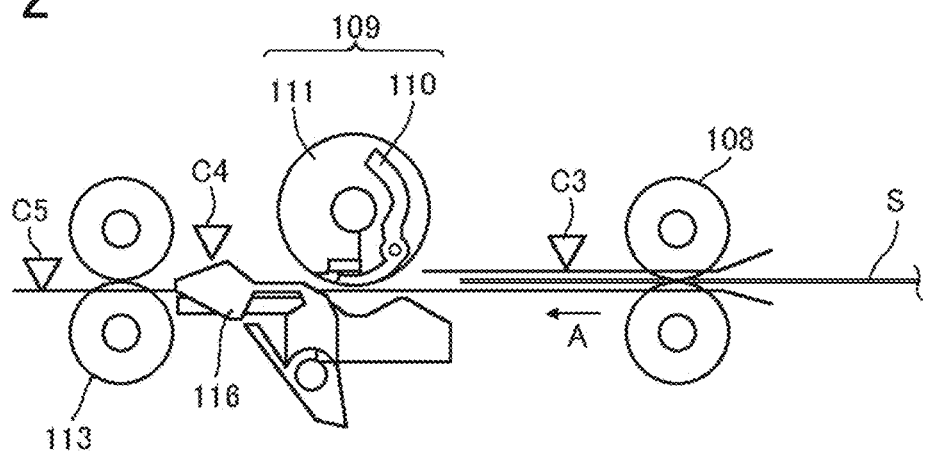
FIG. 2 is a view of a main part of the sheet processing device of FIG. 1.

FIG. 2 is a schematic view of a main part of the sheet processing device of FIG. 1. As illustrated in FIG. 2, each of the entrance roller pair 108 and the exit roller pair 113 is, for example, two rollers paired with each other and driven to rotate by a driver such as a motor. The entrance roller pair 108 rotates in one direction. The exit roller pair 113 rotates in forward and reverse directions, thereby nipping and conveying the lamination sheet S and the inner sheet P together with the entrance roller pair 108.

The entrance roller pair 108 conveys the lamination sheet S and the inner sheet P toward the exit roller pair 113. The sheet conveyance direction indicated by arrow A in FIG. 2 is referred to as a forward conveyance direction (i.e., a direction A).

On the other hand, the exit roller pair 113 is capable of switching the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (i.e., the direction opposite the forward conveyance direction) indicated by arrow B in FIG. 2 is hereinafter referred to as a reverse conveyance direction (i.e., a direction B).

The sheet processing device 100 is provided with the winding roller 109 as a rotator and the separation claw 116 that are disposed between the entrance roller pair 108 and the exit roller pair 113. The winding roller 109 is driven by the driver such as the motor to rotate in the forward and reverse directions. The direction of rotation of the winding roller 109 is switchable between the forward direction (i.e., clockwise direction) and the reverse direction (i.e., counterclockwise direction).

The winding roller 109 includes a roller 111 and a gripper 110 movably disposed on the roller 111 to grip the lamination sheet S. The gripper 110 that is movable grips a trailing end of the lamination sheet S in the forward conveyance direction together with the roller 111. The gripper 110 may be integrated with the outer circumference of the roller 111 or may be a separate component.

Next, a description is given of a series of operations performed in the sheet processing device 100, with reference to FIGS. 1 to 14. The series of operations performed in the sheet processing device 100 indicates the operations from separating the lamination sheet S to inserting the inner sheet P into the lamination sheet S. Note that, in FIGS. 3 to 14, elements identical to the elements illustrated in FIGS. 1 and 2 are given identical reference numerals, and the detailed descriptions of these elements are omitted.

In FIG. 1, the lamination sheets S are loaded on the sheet feed tray 103 such that a part of the bonded side of the lamination sheet S is located downstream from the pickup roller 106 in a sheet feed direction (i.e., the sheet conveyance direction). In the sheet processing device 100, the pickup roller 106 picks up the lamination sheet S from the sheet feed tray 103 and conveys the lamination sheet S toward the entrance roller pair 108.

Next, as illustrated in FIG. 2, the entrance roller pair 108 conveys the lamination sheet S toward the winding roller 109. In the sheet processing device 100, the entrance roller pair 108 conveys the lamination sheet S with the bonded end (i.e., a leading end), which is one of four sides of the lamination sheet S, as a downstream side in the forward conveyance direction (i.e., the direction A) in FIG. 2.

Figure 3:
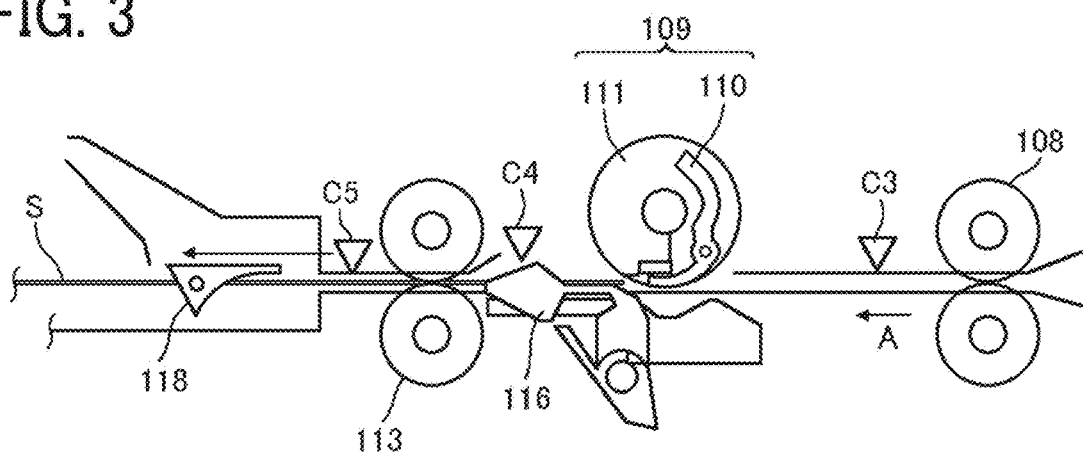
FIG. 3 is a view of the main part of the sheet processing device temporarily stopping sheet conveyance, subsequent to the state in FIG. 2.

Subsequently, as illustrated in FIG. 3, a controller 500 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a designated amount in response to the conveyance sensor C3 detecting the leading end of the lamination sheet S.

Figure 4:
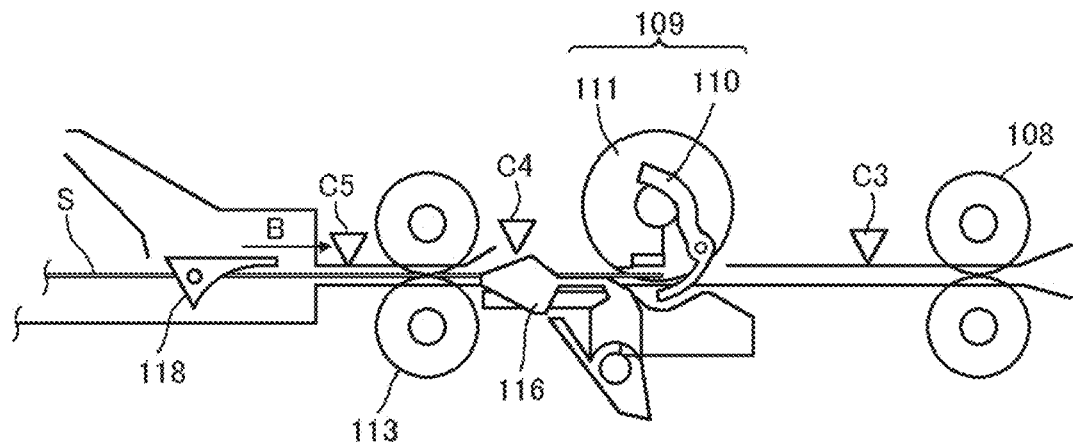
FIG. 4 is a view of the main part of the sheet processing device conveying a lamination sheet, subsequent to the state in FIG. 3.

Next, as illustrated in FIG. 4, the controller 500 of the sheet processing device 100 causes the gripper 110 to open and the exit roller pair 113 to rotate in the reverse direction to convey the lamination sheet S in the reverse conveyance direction (i.e., the direction B) toward an opening portion of the gripper 110.

Figure 5:
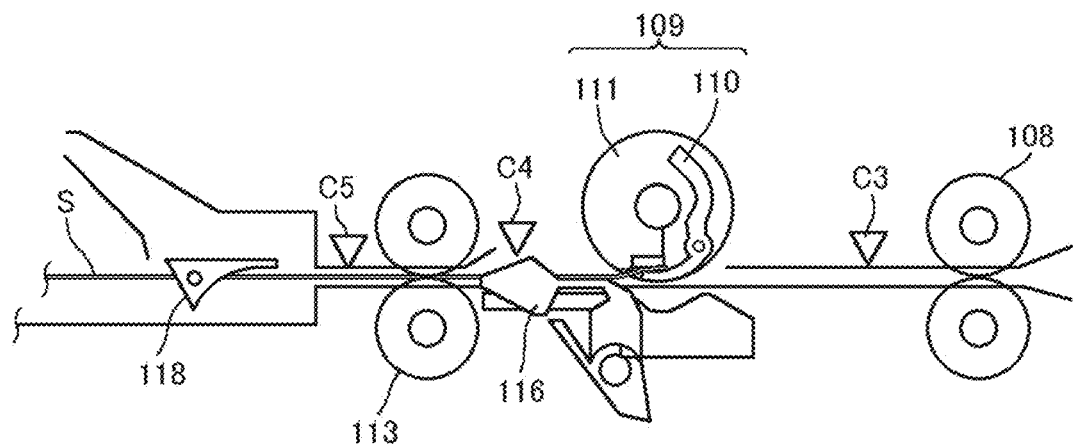
FIG. 5 is a view of the main part of the sheet processing device in a state subsequent to the state in FIG. 4.

Subsequently, as illustrated in FIG. 5, the controller 500 of the sheet processing device 100 causes the exit roller pair 113 to stop rotating and conveyance of the lamination sheet S when the trailing end of the lamination sheet S is inserted into the opening portion of the gripper 110, and causes the gripper 110 to close and grip the trailing end of the lamination sheet S. Note that these operations are performed when the lamination sheet S is conveyed by a designated amount.

Figure 6:
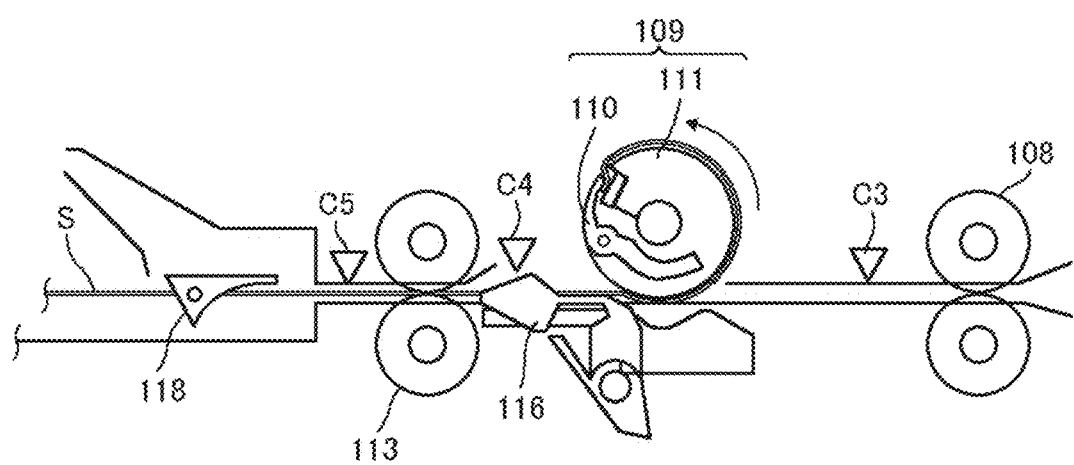
FIG. 6 is a view of the main part of the sheet processing device in which a winding roller rotates in reverse to wind the lamination sheet around the winding roller, subsequent to the state in FIG. 5.

Then, as illustrated in FIG. 6, the controller 500 of the sheet processing device 100 causes the winding roller 109 to rotate in the counterclockwise direction to wind the lamination sheet S around the winding roller 109. The lamination sheet S is wound around the winding roller 109 from a side (i.e., the trailing end) where the two overlapping sheets of the lamination sheet S are not bonded.

Figure 7:
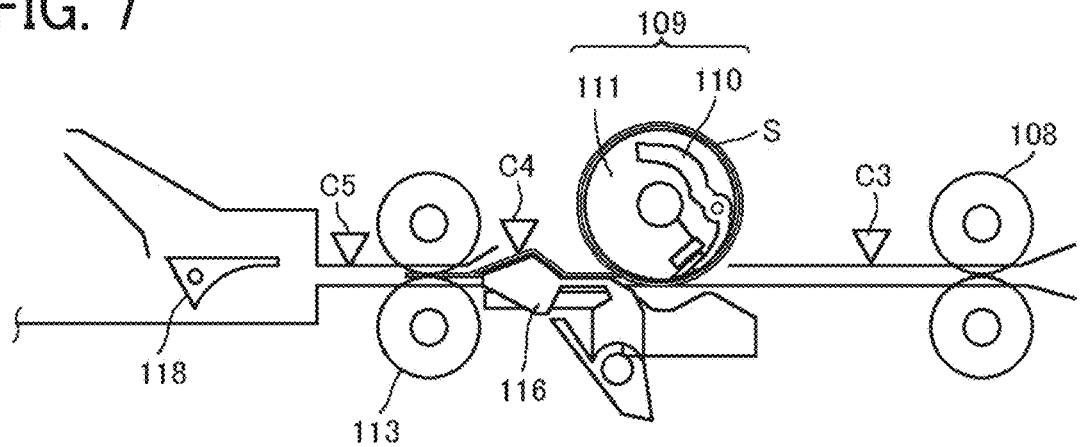
FIG. 7 is a view of the main part of the sheet processing device in which separation claws are inserted into a space between two sheets of the lamination sheet, subsequent to the state in FIG. 6.

As illustrated in FIG. 7, when the lamination sheet S as a two-ply sheet is wound around the winding roller 109, a winding circumferential length difference is generated between the two sheets in the amount of winding of the lamination sheet S around the circumference of the winding roller 109. The winding circumferential length difference causes a surplus of the inner circumferential sheet closer to the center of the winding roller 109 than an outer circumferential sheet of the two-ply sheet, thus loosing the inner circumferential sheet toward the bonded end. As a result, a space is formed between the two sheets constructing the two-ply sheet. As the separation claws 116 are inserted into the space formed as described above, from opposed sides of the lamination sheet S, the space between the two sheets is reliably maintained. When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Figure 8:
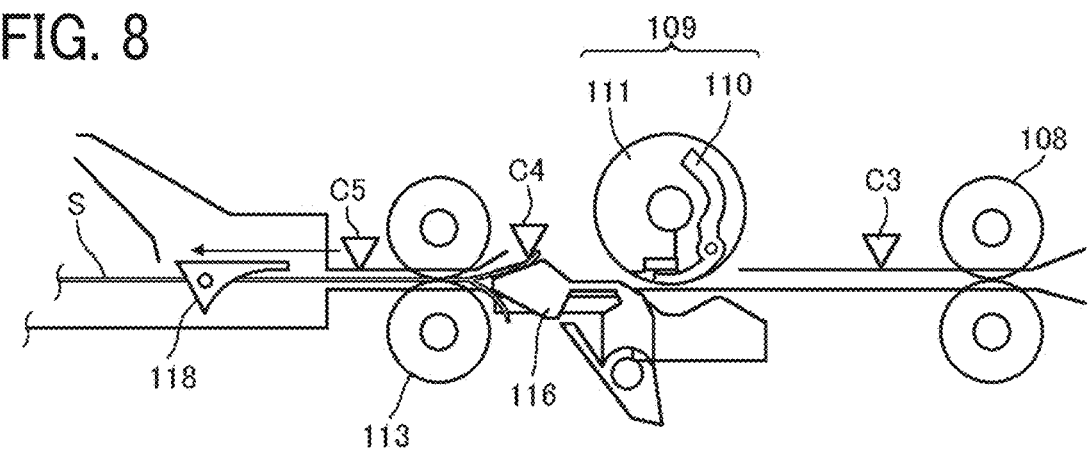
FIG. 8 is a view of the main part of the sheet processing device in which the winding roller rotates in a forward direction so as to move the space in the lamination sheet and the separation claws to an end of the lamination sheet, subsequent to the state in FIG. 7.

With the separation claws 116 inserted in the space in the lamination sheet S (see FIG. 7), the controller 500 of the sheet processing device 100 causes the winding roller 109 to rotate in the clockwise direction and shift the space formed in the lamination sheet S to the trailing end of the lamination sheet S in the forward conveyance direction (i.e., the direction A), as illustrated in FIG. 8. After the winding roller 109 has been rotated by a designated amount, the controller 500 of the sheet processing device 100 causes the gripper 110 to open. As a result, the lamination sheet S is separated into the upper and lower sheets at the trailing end.

In this state, the controller 500 of the sheet processing device 100 temporarily stops the conveyance of the lamination sheet S and further moves the separation claws 116 in the width direction of the lamination sheet S to separate the whole area of the trailing end of the lamination sheet S. When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Figure 9:
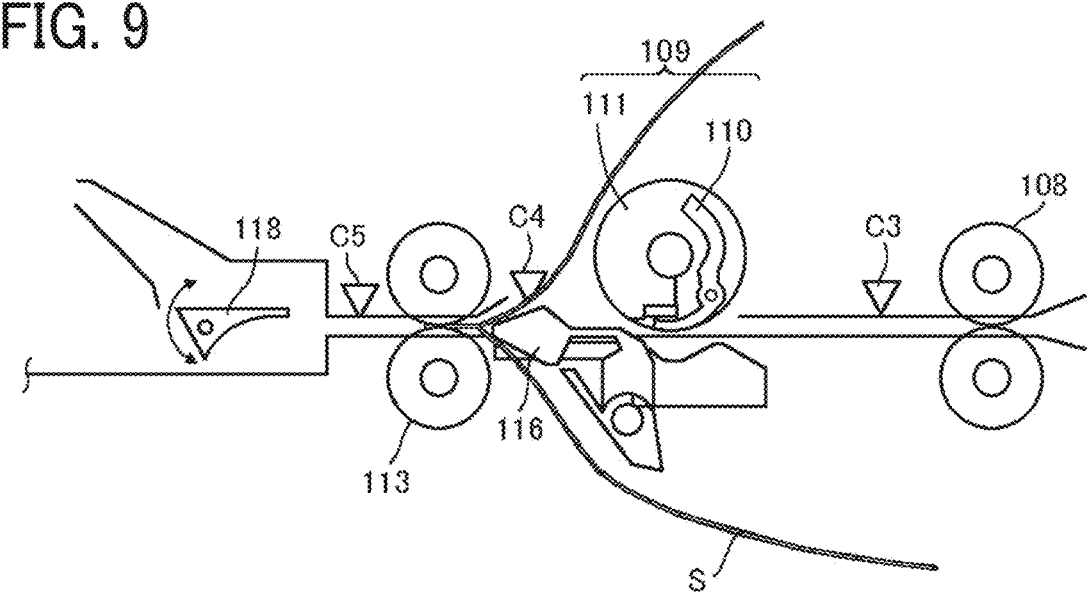
FIG. 9 is a view of the main part of the sheet processing device conveying the lamination sheet in reverse with ends of the two sheets separated, subsequent to the state in FIG. 8.

In the state illustrated in FIG. 8, the controller 500 of the sheet processing device 100 causes the exit roller pair 113 to rotate counterclockwise and convey the lamination sheet S in the reverse conveyance direction (i.e., the direction B) as illustrated in FIG. 9. A branching claw 118 can be switched at the time when the leading end of the lamination sheet S passes through the conveyance sensor C5. When the lamination sheet S is conveyed to a non-fixing passage, the branching claw 118 remains at the position illustrated in FIG. 8. However, when the lamination sheet S is conveyed to a fixing passage 128, the branching claw 118 is switched in the direction toward the fixing passage 128 in FIG. 10.

The switching of the branching claw 118 may be completed in a period of time from when the leading end of the lamination sheet S passes through the conveyance sensor C5 to when the leading end of the lamination sheet S reaches the branching claw 118 after insertion of the inner sheet P. If the branching claw 118 is switched before this timing, the lamination sheet S before insertion of the inner sheet P enters the fixing passage 128 and a part of the lamination sheet S is fixed. If the position of a fixing unit is disposed further downstream in the sheet conveyance direction in order to prevent such a failure, the size of the sheet processing apparatus would be increased.

As illustrated in FIG. 9, the separation claws 116 guide the two separated sheets of the lamination sheet S in the upper and lower directions and thus the two sheets are fully separated. Then, the controller 500 of the sheet processing device 100 causes the exit roller pair 113 to stop the conveyance of the lamination sheet S temporarily, so that the bonded portion of the lamination sheet S is held (nipped) by the exit roller pair 113. Accordingly, one end of the lamination sheet S is bonded as the bonded side of the lamination sheet S and the other end of the lamination sheet S is opened widely.

When the conveyance sensor C5 detects the leading end of the lamination sheet S, the controller 500 of the sheet processing device 100 receives a trigger signal from the conveyance sensor C5. The controller 500 of the sheet processing device 100 causes the exit roller pair 113 to convey the lamination sheet S by a designated amount from the conveyance sensor C5.

Figure 10:
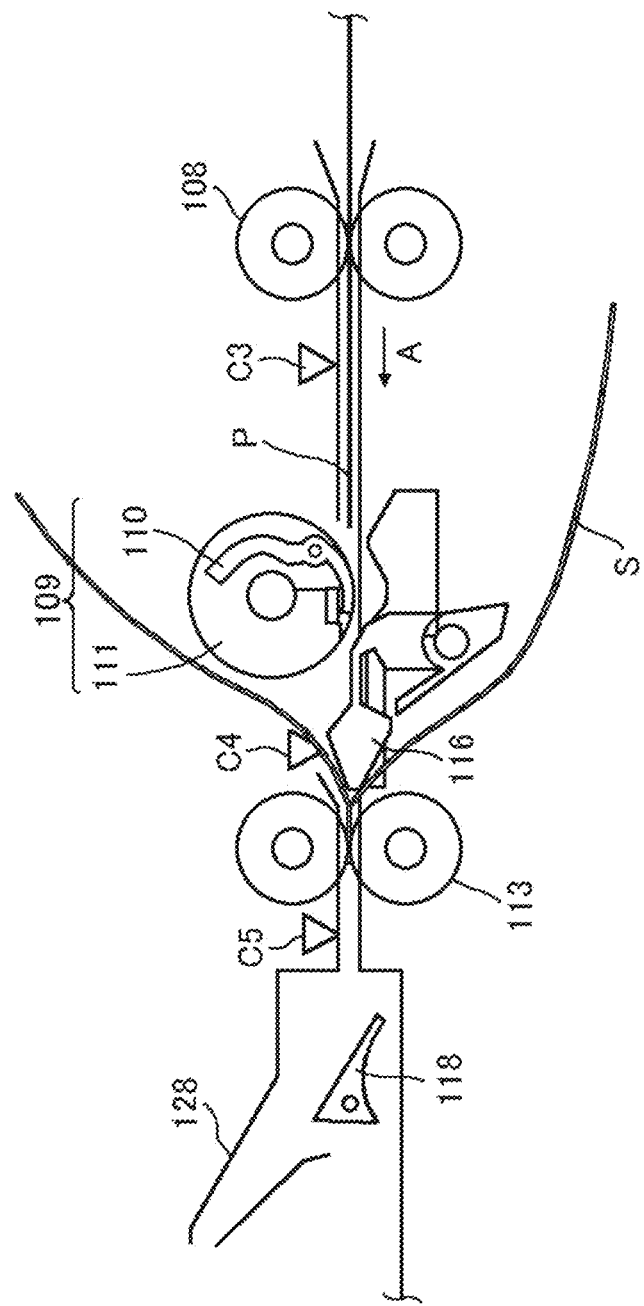
FIG. 10 is a view of the main part of the sheet processing device conveying an inner sheet toward the lamination sheet, subsequent to the state in FIG. 9.
Figure 11:
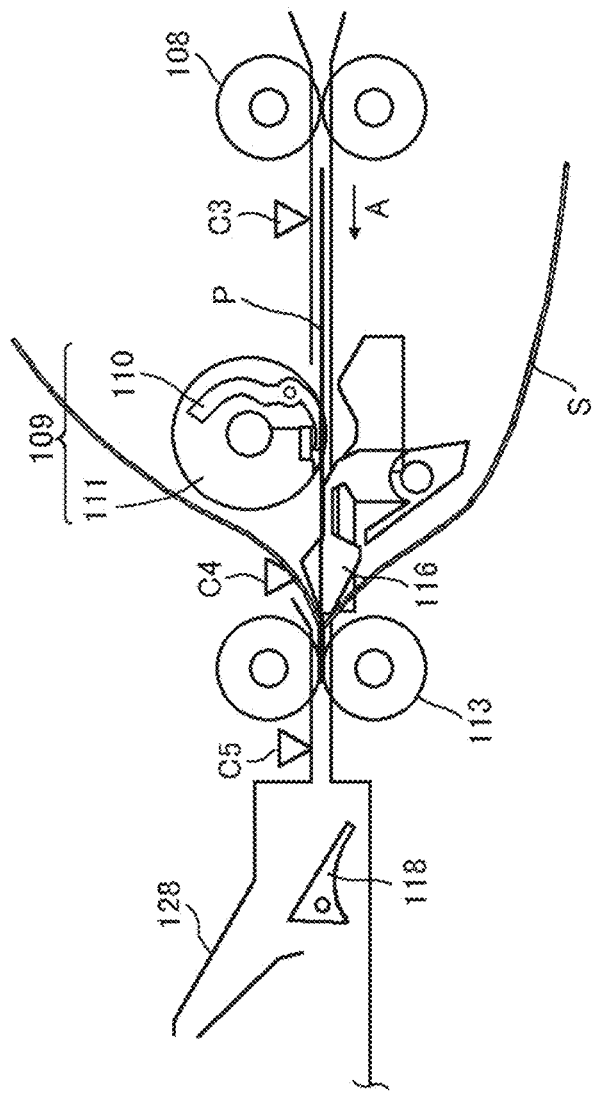
FIG. 11 is a view of the main part of the sheet processing device in which the inner sheet is inserted into the lamination sheet, subsequent to the state in FIG. 10.
Figure 12:
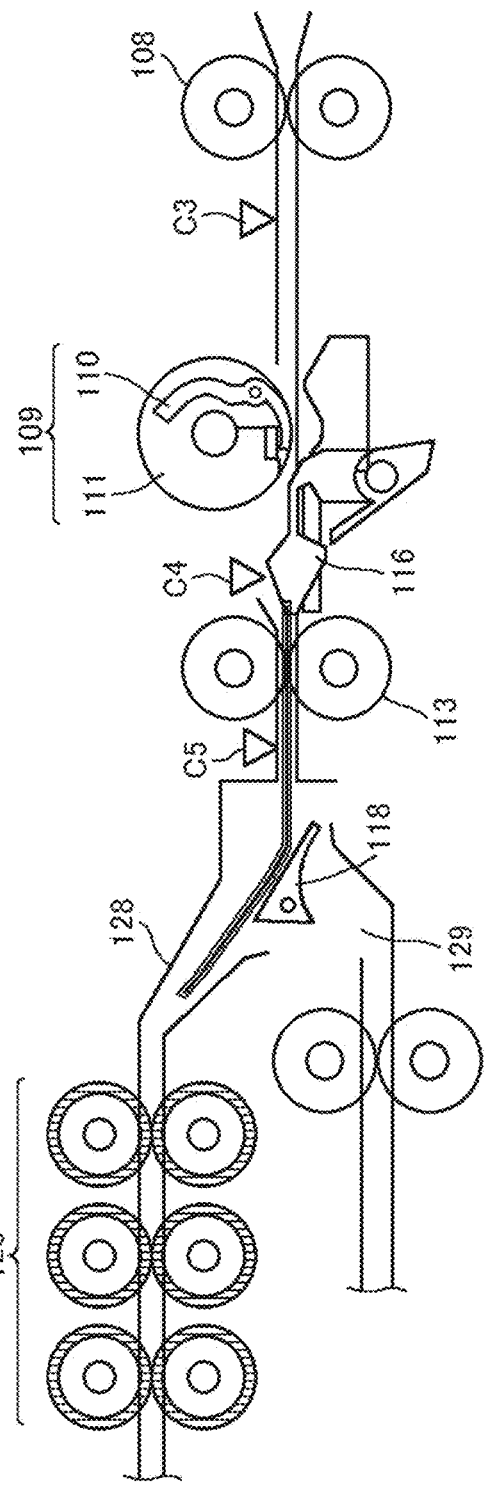
FIG. 12 is a view of the main part of the sheet processing device conveying the lamination sheet inserted in the inner sheet, subsequent to the state in FIG. 11.

FIGS. 10 to 12 illustrate the operation of the sheet processing device 100 when the lamination sheet S is conveyed to the fixing passage 128 in case in which the user selects a laminate processing mode on the operation panel 10. Next, as illustrated in FIG. 10, the controller 500 of the sheet processing device 100 causes the entrance roller pair 108 to rotate and convey the inner sheet P conveyed by the pickup roller 105 and the conveying roller pair 107 from the sheet feed tray 102 (see FIG. 1) toward the exit roller pair 113 in the forward conveyance direction (i.e., the direction A).

Subsequently, as illustrated in FIG. 11, the controller 500 of the sheet processing device 100 causes the exit roller pair 113 to rotate so that the lamination sheet S and the inner sheet P meet, to insert the inner sheet P into the opening of the lamination sheet S.

Then, as illustrated in FIG. 12, the controller 500 of the sheet processing device 100 causes the exit roller pair 113 to convey the lamination sheet S in which the inner sheet P is inserted in the forward conveyance direction (i.e., the direction A). Thus, the two sheets of the lamination sheet S are overlapped one on another again so as to close the opening of the lamination sheet S. The lamination sheet S sandwiching the inner sheet P is conveyed to the fixing unit including a heat pressing roller 120 by the exit roller pair 113 or a roller disposed downstream from the exit roller pair 113. Finally, the lamination sheet S is ejected onto the sheet ejection tray 104 (see FIG. 1). Thus, the lamination sheets S lie stacked on the sheet ejection tray 104. FIGS. 2 to 12 illustrate a basic operation to separate the two sheets of the lamination sheet S and conveying the lamination sheet S to a fixing device (i.e., the fixing unit) in a case of performing a laminate processing.

As described above, the controller 500 of the sheet processing device 100 according to the present embodiment causes the separation claw 116 to open the lamination sheet S widely so that the inner sheet P is inserted in and sandwiched between the two sheets of the lamination sheet S. Since the configuration of the sheet processing device 100 is simpler than the configuration of a typical laminating device employing a vacuum device, the entire sheet processing device has a simpler and smaller configuration.

As illustrated in FIG. 1, the sheet processing device 100 according to the present embodiment loads the lamination sheets S and the inner sheets P on separate trays and conveys the lamination sheets S and the inner sheets P separately. Such a configuration omits the need to load the lamination sheets S and the inner sheets P in a predetermined order, the convenience of the sheet processing device 100 is enhanced.

Figure 13:
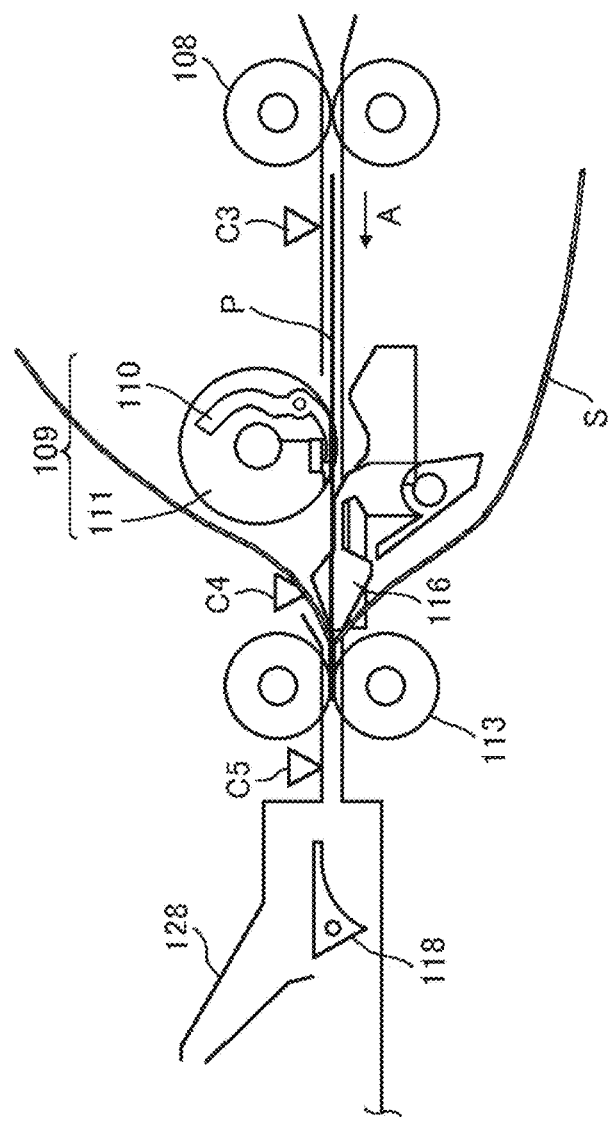
FIG. 13 is a view of the main part of the sheet processing device in which the inner sheet is inserted into the lamination sheet and a branching claw is switched to a non-fixing passage.
Figure 14:
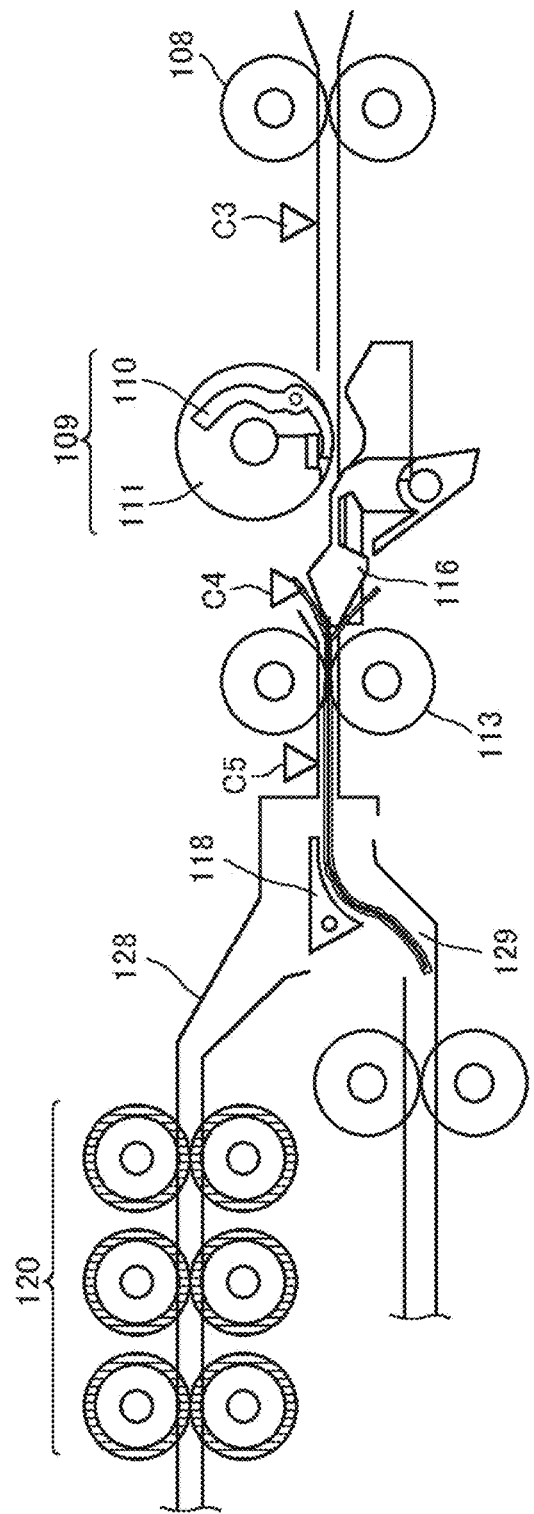
FIG. 14 is a view of the main part of the sheet processing device conveying the lamination sheet inserted in the inner sheet to the non-fixing passage, subsequent to the state in FIG. 13.

On the other hand, when the user selects an inner-sheet insertion mode on the operation panel 10, the sheet processing device 100 operates as illustrated in FIGS. 13 to 14. In FIGS. 2 to 9, the sheet processing device 100 operates in the same manner as described above. However, as illustrated in FIG. 13, the branching claw 118 remains unchanged to convey the inner sheet P to a non-fixing passage 129.

Next, as illustrated in FIG. 14, in a state in which both the lamination sheet S and the inner sheet P are gripped (nipped), the controller 500 of the sheet processing device 100 causes the exit roller pair 113 to convey the lamination sheet S and the inner sheet P so that the inner sheet P is inserted into the two sheets of the lamination sheet S. Subsequently, the lamination sheet S is conveyed to the non-fixing passage 129 that does not have the heat pressing rollers 120. The lamination sheet S is then ejected and rests on a sheet ejection tray 126 (see FIG. 15) to complete the sheet ejection. In this way, the user can obtain the lamination sheet S in which the inner sheet P is inserted. The lamination sheet S can be fixed on an offline machine.

In the sheet processing device 100 described above or a laminating device 200 described later, the user can select a cleaning mode using the operation panel 10 to convey a plurality of cleaning sheets. At that time, a subsequent cleaning sheet can be conveyed to a position different from a position of a preceding cleaning sheet, which precedes the subsequent cleaning sheet, in a direction orthogonal to a cleaning sheet conveying direction in which the cleaning sheets are conveyed. A description is given of the laminating device 200 below.

Figure 15:
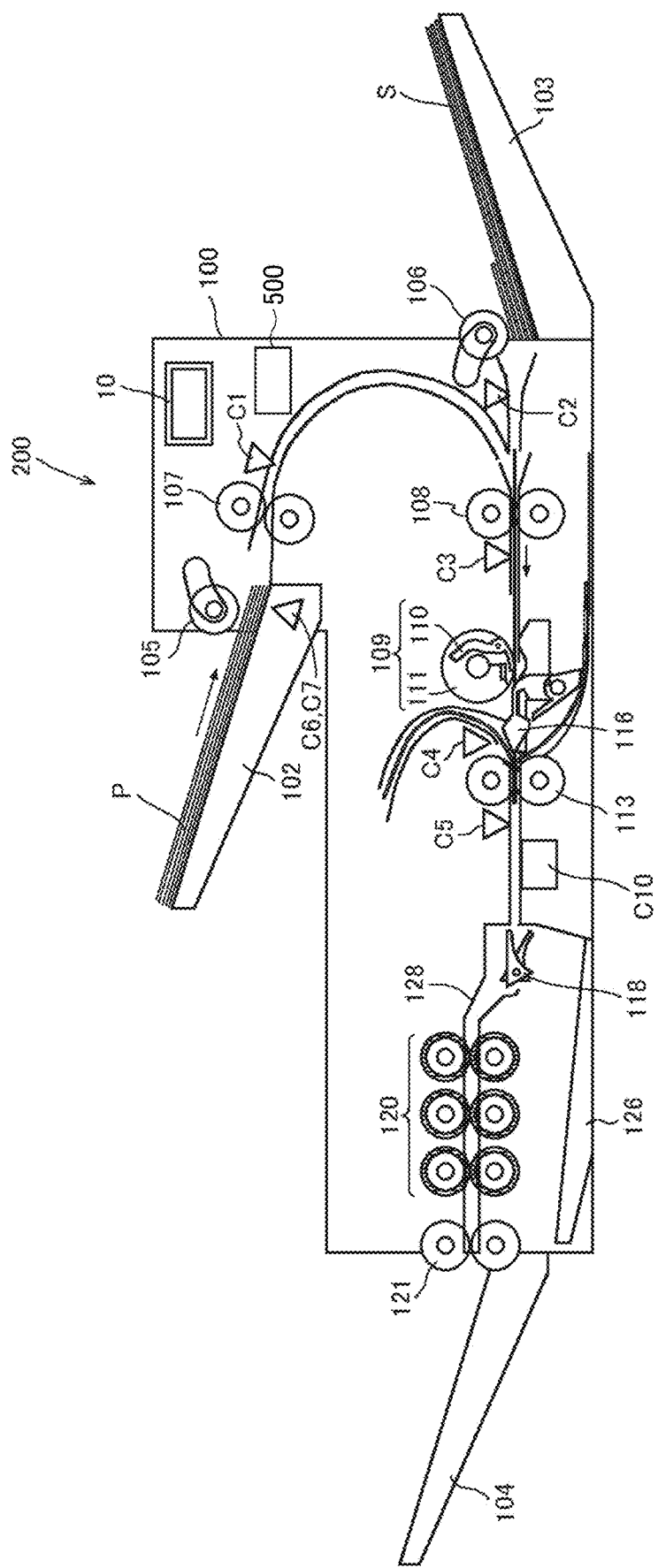
FIG. 15 is a schematic diagram illustrating an overall configuration of a laminating device including a sheet processing device according to an embodiment of the present disclosure.

FIG. 15 is a schematic diagram illustrating an overall configuration of a laminating device including a sheet processing device according to an embodiment of the present disclosure. The laminating device 200 includes the sheet processing device 100 described above. The laminating device 200 includes the separation claws 116, the exit roller pair 113, and the branching claw 118. The separation claws 116 are separators that separate the lamination sheet S. The exit roller pair 113 disposed downstream from the separation claws 116 is a conveyor that conveys the lamination sheet S.

The branching claw 118 is a switch that switches the sheet conveyance passages of the lamination sheet S. The controller 500 of the sheet processing device 100 causes the branching claw 118 to switch the sheet conveyance passages of the lamination sheet S between the fixing passage 128 on which fixing is performed on the lamination sheet S and the non-fixing passage 129 on which fixing is not performed on the lamination sheet S (see FIGS. 12 and 14). Accordingly, when the user selects the non-fixing mode (i.e., inner-sheet insertion mode), the lamination sheet S can be ejected without being fixed through the non-fixing passage 129 with the inner sheet P inserted in the lamination sheet S. Thus, the insertion of the inner sheet P is performed by automation without any trouble. The user can perform a laminating work on another offline machine, thus allowing a parallel work and enhancing the productivity of work.

The laminating device 200 includes an ejection roller pair 121, the sheet ejection tray 104, and the sheet ejection tray 126. The ejection roller pair 121 is disposed downstream from the heat pressing rollers 120 in the sheet conveyance direction. The sheet ejection tray 104 stacks the lamination sheets S conveyed through the fixing passage 128. The sheet ejection tray 126 stacks the lamination sheets S conveyed through the non-fixing passage 129 not having the heat pressing rollers 120.

The laminating device 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations can be performed automatically without human intervention, and convenience can be improved compared to the related art.

However, the laminate processing is an example of sheet processing. The laminating device may be broadly referred to as a sheet processing device.

Similar to the sheet processing device 100 described above, in the laminating device 200, the lamination sheet S into which the inner sheet P has been inserted is ejected onto the sheet ejection tray 104 by the exit roller pair 113 or a roller disposed downstream from the exit roller pair 113. Thus, the lamination sheets S lie stacked on the sheet ejection tray 104. The sheet conveyance passage to reverse the inner sheet P allows the inner sheets P to be ejected and stacked on the sheet ejection tray 104 in the order of the inner sheets P stacked on the sheet feed tray 102.

Figure 16:
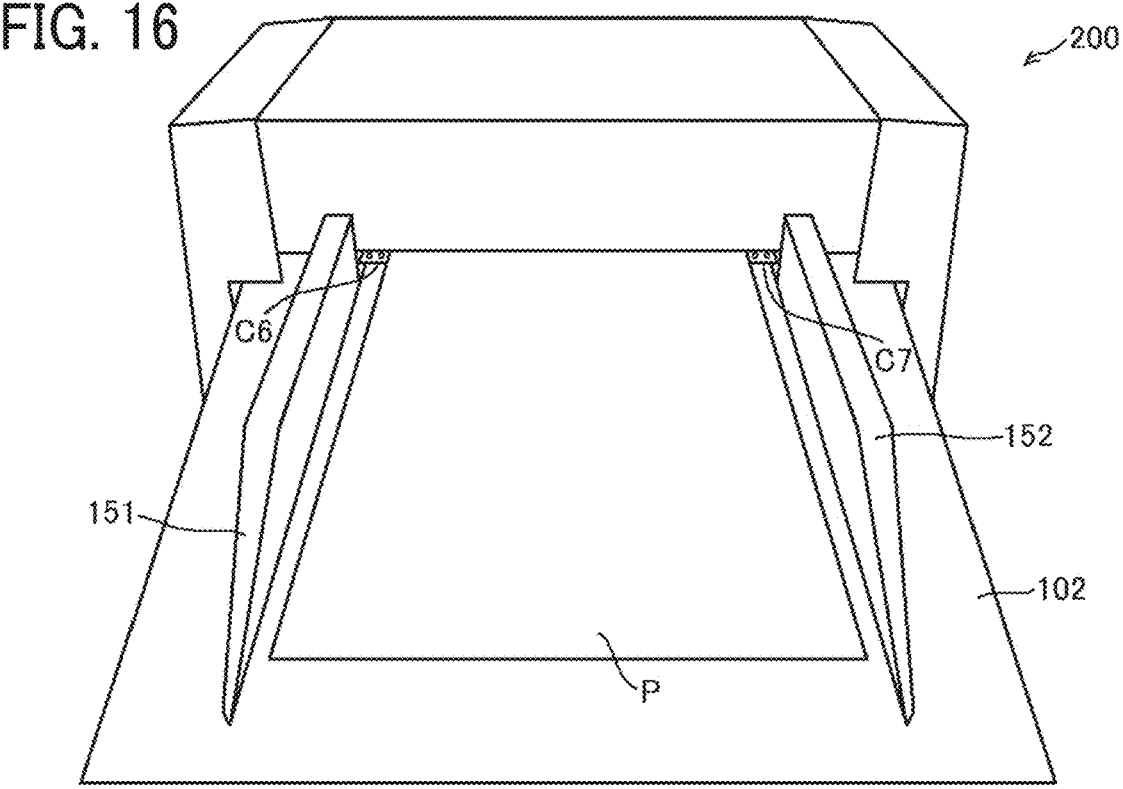
FIG. 16 is a perspective view of a sheet feed tray on which the inner sheets or cleaning sheets are loaded.
Figure 17:
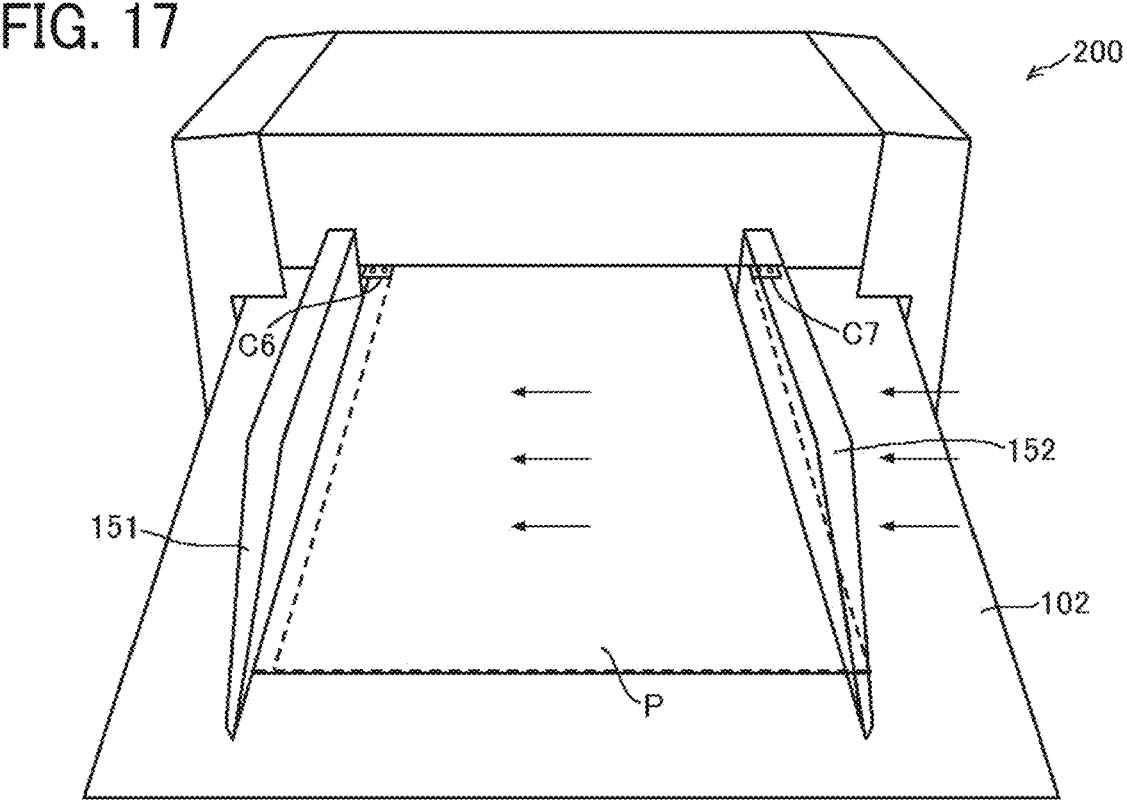
FIG. 17 is a schematic diagram illustrating a movement of the cleaning sheet in a main scanning direction.

FIG. 16 is a schematic perspective view of the sheet feed tray 102 on which the inner sheets P or the cleaning sheets are loaded.

Sheet end detection sensors C6 and C7 for detecting an end of the inner sheet P are disposed on the back side of the sheet feed tray 102 of the laminating device 200. An end of each of the cleaning sheets loaded on the sheet feed tray 102 is detected by the sheet end detection sensors C6 and C7. In the present specification, unless otherwise specified, the "end" means the "end in the main scanning direction" (i.e., lateral direction in FIG. 16). The sheet feed tray 102 is provided with side fences or joggers 151 and 152 that are movable in the main scanning direction to restrain the ends in the main scanning direction of the inner sheet P. According to the present embodiment, the side fences or the joggers 151 and 152 serve as movers for moving the inner sheet P or the cleaning sheet in a direction orthogonal to the sheet conveyance direction. Note that, since the inner sheet P has the same size as the cleaning sheet, the description of the inner sheet P also applies to the cleaning sheet, and vice versa. As the detection sensor, an optical sensor such as a reflective sensor or a transmissive sensor using a feeler may be used. Alternatively, an image sensor such as a sheet end detection sensor C10 may be used.

FIGS. 17 to 20 are schematic diagrams illustrating the movement of the cleaning sheet in the main scanning direction. First, a description is given of an embodiment in which a position (i.e., a position in the main scanning direction) of the cleaning sheet in the direction orthogonal to the cleaning sheet conveyance direction is moved before the cleaning sheet is conveyed (fed) using the sheet feed tray 102. Hereinafter, this movement is appropriately referred to as a "pre-conveyance position movement." In FIG. 17, the sheet end detection sensors C6 and C7 as detectors are located according to the end positions in the direction orthogonal to the sheet conveyance direction of the heat pressing roller 120 and the lamination sheet S, which are larger than A4 size (shorter side of A4) corresponding to the size of, e.g., the inner sheet P. Accordingly, neither of the ends of the cleaning sheet in A4 size (shorter side of A4) is detected by the sheet end detection sensors C6 and C7. Therefore, in a case where neither of the ends of the inner sheet P is detected, the controller 500 of the laminating device 200 causes the side fences or the joggers 151 and 152 to move in the main scanning direction. In this example, in order to detect the inner sheet P by the sheet end detection sensor C6, the side fence or the jogger 152 is moved to the left in FIG. 17, and the inner sheet P is moved from the original broken line position to the solid line position. The side fence or the jogger 151 in the main scanning direction may be moved automatically or manually by the user.

Figure 18:
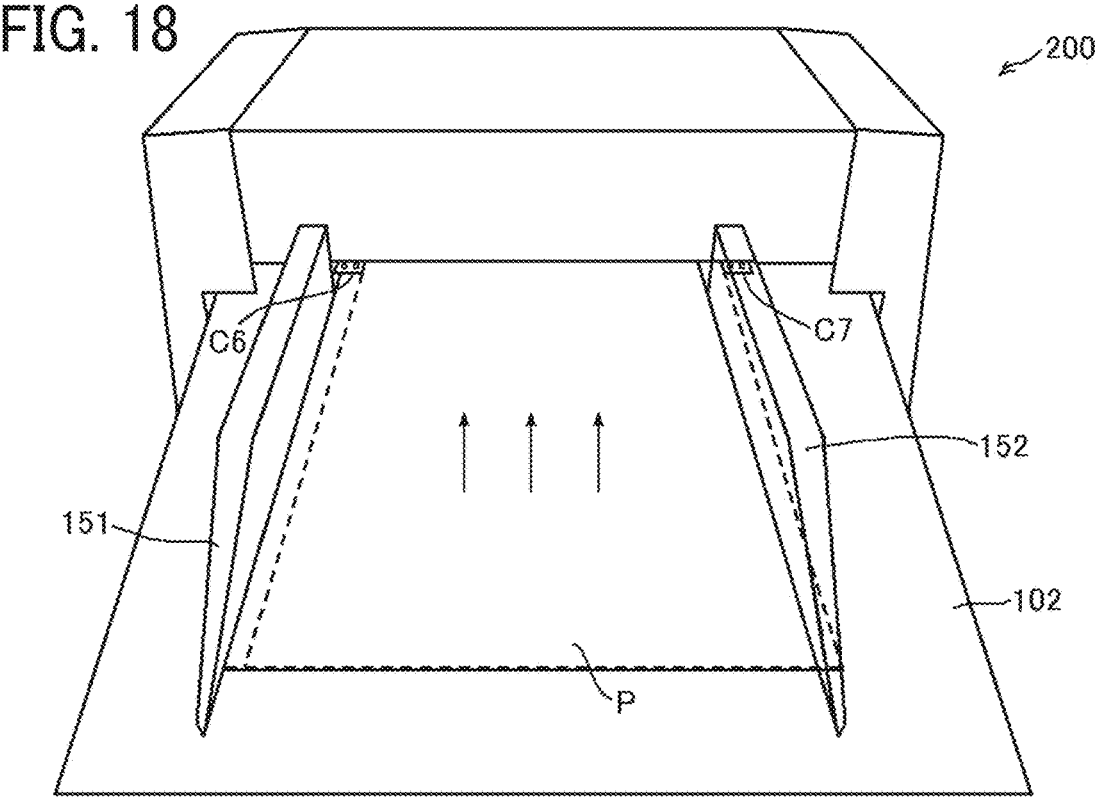
FIG. 18 is a schematic diagram illustrating a movement of the cleaning sheet in a sub-scanning direction.

In FIG. 18, after the jogger 152 of the sheet feed tray 102 of the laminating device 200 is moved to the left, when the left end of the cleaning sheet is detected by the sheet end detection sensor C6, the controller 500 of the laminating device 200 causes the pickup roller 105 to start feeding the cleaning sheet from the sheet feed tray 102. As illustrated by the arrows in FIG. 18, the cleaning sheet is fed and conveyed in the sub-scanning direction orthogonal to the main scanning direction.

Figure 19:
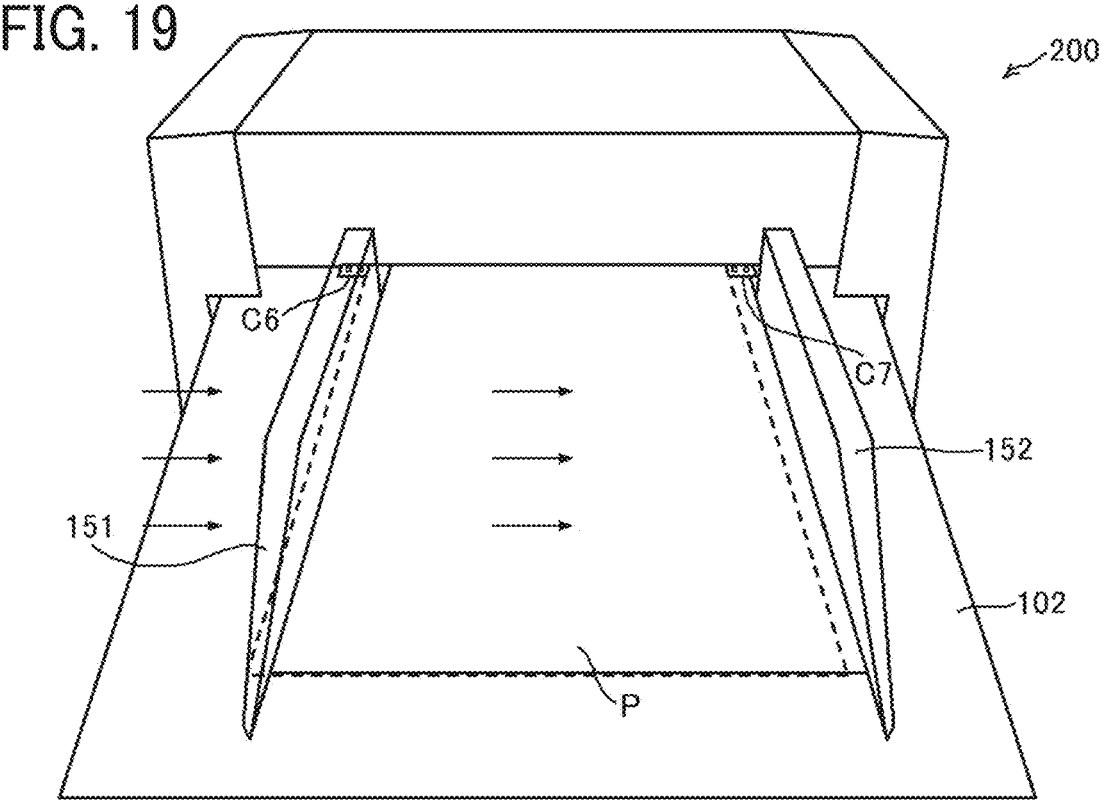
FIG. 19 is a schematic diagram illustrating another movement of the cleaning sheet in the main scanning direction.

Next, in FIG. 19, in order to convey the subsequent cleaning sheet at a position different from the position of the preceding cleaning sheet in the direction orthogonal to the cleaing sheet conveyance direction, the jogger 151 is moved to the right in FIG. 19 until the right end of the cleaning sheet is detected by the sheet end detection sensor C7. In order to detect the inner sheet P by the sheet end detection sensor C7, the inner sheet P is moved from the original broken line position to the solid line position. The side fence or the jogger 151 in the main scanning direction may be moved automatically or manually by the user.

Figure 20:
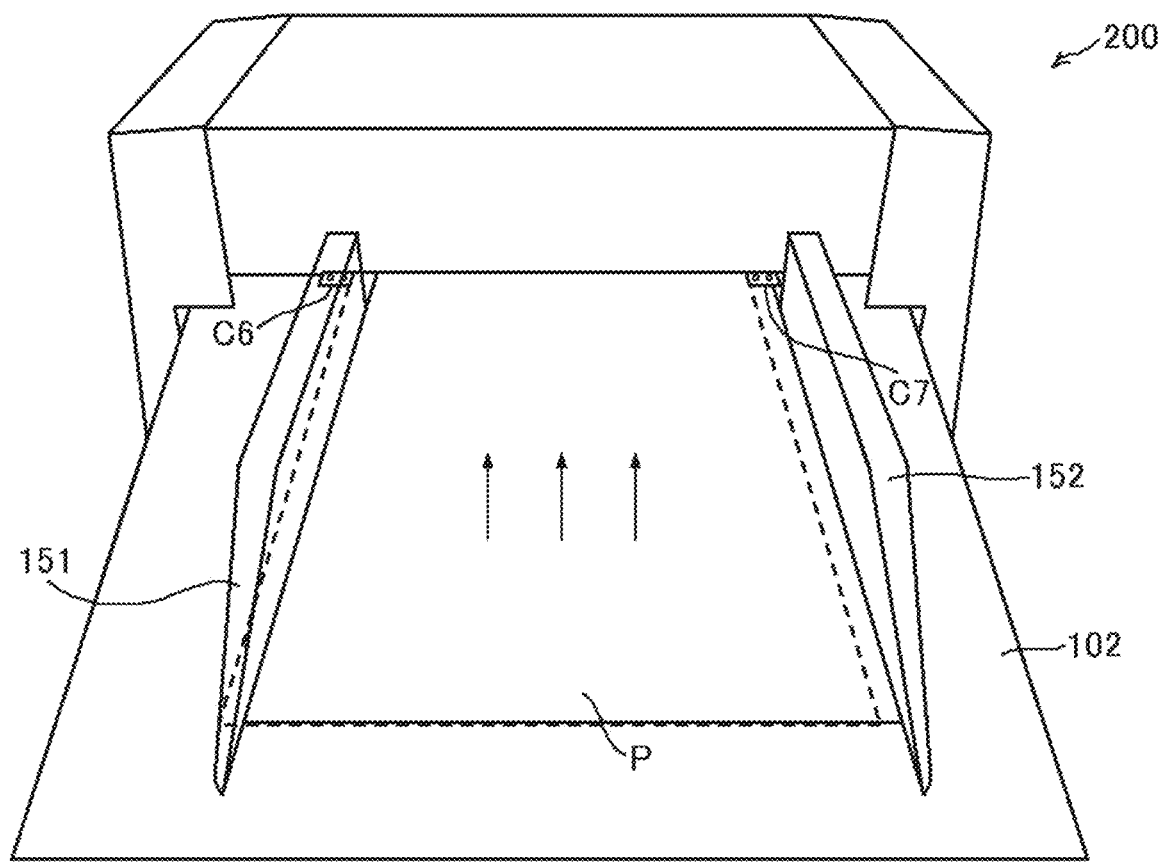
FIG. 20 is a schematic diagram illustrating another movement of the cleaning sheet in the sub-scanning direction.

In FIG. 20, after the side fence 151 of the sheet feed tray 102 of the laminating device 200 is moved to the right, when the right end of the cleaning sheet is detected by the sheet end detection sensor C7, the controller 500 of the laminating device 200 causes the pickup roller 105 to start feeding the cleaning sheet from the sheet feed tray 102.

In this way, the plurality of cleaning sheets set on the sheet feed tray 102 by the user is automatically or manually moved to different positions in the direction orthogonal to the cleaning sheet conveyance direction by the side fence or the jogger 151.

As described above, according to the laminating device 200 of the present embodiment, in the cleaning mode for cleaning the heat pressing roller 120, a plurality of cleaning sheets as cleaners that clean the heat pressing roller 120 is conveyed. A subsequent cleaning sheet of the plurality of cleaning sheets is conveyed at a position different from a position of a preceding cleaning sheet of the plurality of cleaning sheets in the direction orthogonal to the cleaning sheet conveyance direction. Such a configuration omits the need, caused by the cleaning sheet (A4 size) smaller than the lamination sheet S, to repeat the work of conveying one or more cleaning sheets for cleaning the heat pressing roller 120 in a range equal to or larger than the width of the lamination sheet S. Thus, the efforts and time taken for the work are reduced.

According to the laminating device 200 in the present embodiment, the subsequent cleaning sheet is moved to a position different from the position of the preceding sheet in the direction orthogonal to the cleaning sheet conveyance direction on the sheet feed tray 102 before the subsequent cleaning sheet is conveyed. Such a configuration eliminates the time and labors for moving the subsequent cleaning sheet to a position different from the position of the preceding cleaning sheet to clean the heat pressing roller 120 in a range equal to or larger than the width of the lamination sheet S.

Further, the user may move the subsequent cleaning sheet to a position different from the position of the preceding sheet in the direction orthogonal to the cleaning sheet conveyance direction before conveying the subsequent cleaning sheet. By moving the cleaning sheet before conveyance, the user can clean the heat pressing roller 120, with the cleaning sheets, in a range equal to or larger than the width of the lamination sheet S.

Alternatively, the plurality of cleaning sheets set on the sheet feed tray 102 by the user may be automatically moved to different positions in the direction orthogonal to the cleaning sheet conveyance direction by the side fence or the joggers 151 and 152. At the time of conveyance, in particular, the preceding cleaning sheet and the subsequent cleaning sheet are conveyed to the heat pressing roller 120 in a range equal to or larger than the width of the lamination sheet S. Such a configuration allows the user to simply set the cleaning sheets so that the heat pressing roller 120 is automatically cleaned in a range equal to or larger than the width of the lamination sheet S.

The cleaning sheet may be fed without the separating operation of the lamination sheet S. Simply passing the cleaning sheets through the heat pressing roller 120 shortens the cleaning time.

In the laminating device 200 of the present embodiment, the sheet feed tray 102 may load the lamination sheets S. The controller 500 of the laminating device 200 causes the sheet end detection sensors C6 and C7 as the detector to detect whether the lamination sheets S or one of the inner sheets P and the cleaning sheets is loaded on the sheet feed tray 102. As a result, the lamination sheet S and the inner sheet P (or cleaning sheet) can be discriminated, so that the sheet feed timing or sheet conveyance timing of the lamination sheet S and the inner sheet (or cleaning sheet) can be determined.

The laminating device 200 in the present embodiment includes the conveyance sensor C1 as another detector for detecting the leading end and the trailing end of the lamination sheet S, the inner sheet P, or the cleaning sheet downstream from the sheet feed tray 102 in the sheet conveyance direction (see FIG. 15). This configuration allows a condition detection and conveyance timing of the lamination sheet S and the inner sheet P to be determined, and also allows the user to set the cleaning sheet without concern about the length of the cleaning sheet in the sub-scanning direction.

Next, a description is given of an embodiment in which the position of the cleaning sheet in the main scanning direction is moved by the exit roller pair 113 moved in the main scanning direction after the cleaning sheet is fed.

Figure 21:
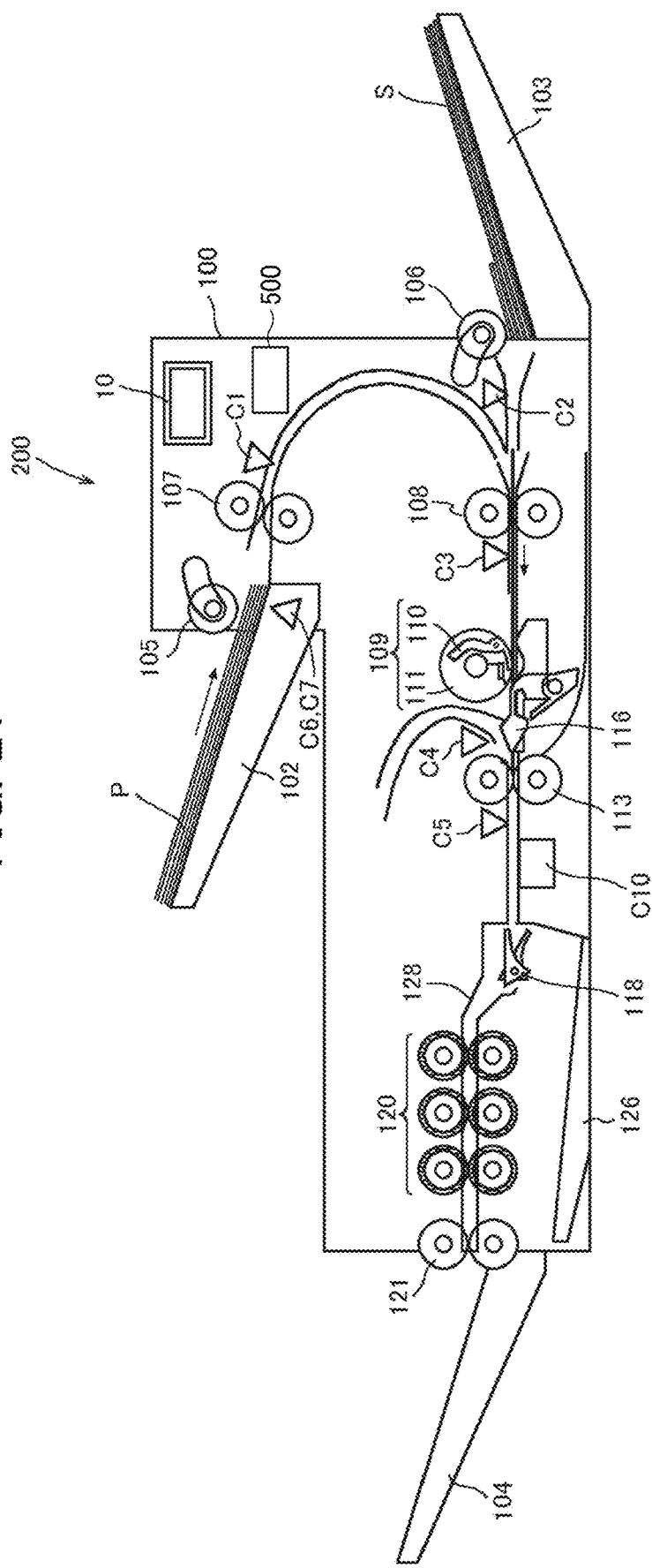
FIG. 21 is a schematic diagram illustrating an overall configuration of a laminating device including a sheet processing device according to an embodiment of the present disclosure.

FIG. 21 is a schematic diagram illustrating an overall configuration of a laminating device including a sheet processing device according to an embodiment of the present disclosure. In the present embodiment, first, a cleaning sheet is fed from the sheet feed tray 102. After the cleaning sheet passes through the sheet conveyance passage, a tilt correcting operation of the cleaning sheet is performed with the exit roller pair 113. Specifically, the leading end of the cleaning sheet is abutted against the exit roller pair 113 so that the leading end of the cleaning sheet is aligned with the nip line of the exit roller pair 113. Thus, the tilt correcting operation of the cleaning sheet is performed. This tilt correcting operation may be omitted in a case where the above-described pre-conveyance position movement is performed.

Figure 22A:
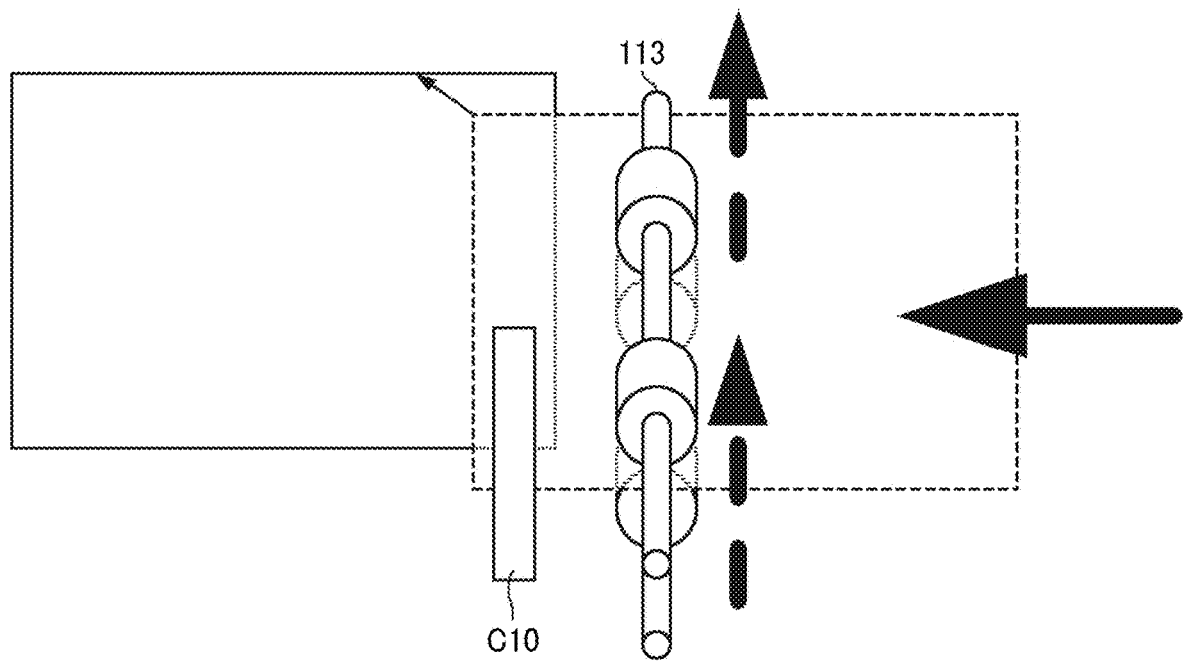
FIG. 22A is a schematic diagram illustrating a movement of an exit roller pair in the main scanning direction.
Figure 22B:
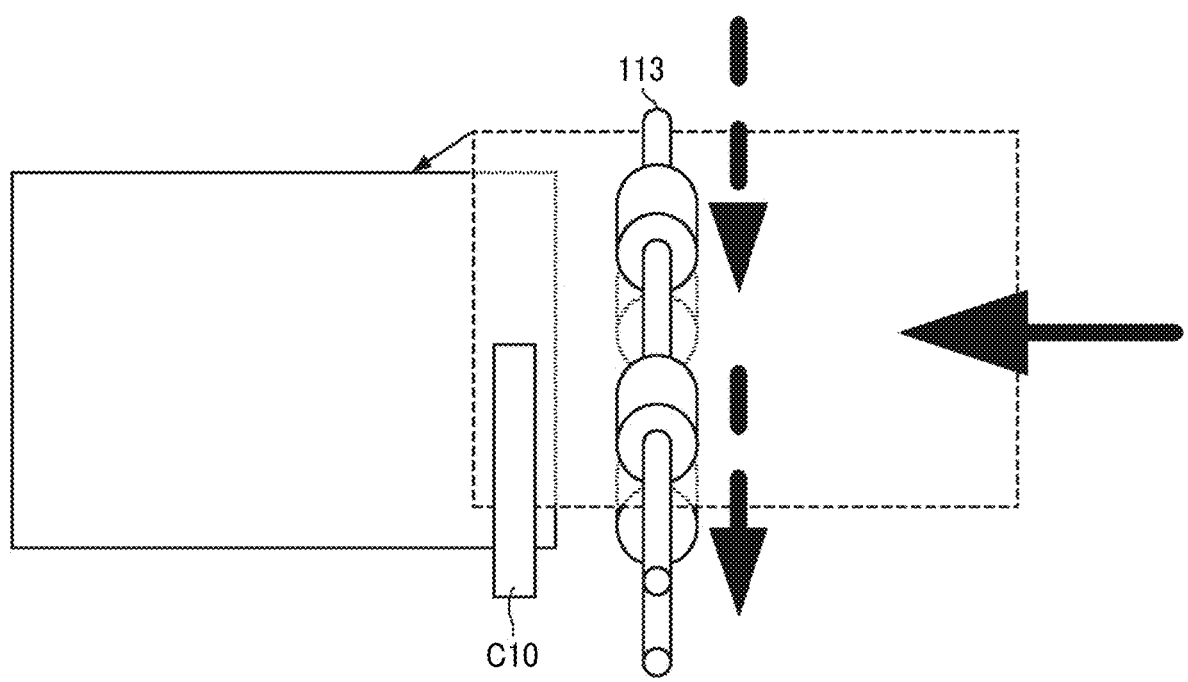
FIG. 22B is a schematic diagram illustrating another movement of the exit roller pair in the main scanning direction.

FIG. 22A is a schematic diagram illustrating a movement of the exit roller pair 113 in the main scanning direction. FIG. 22B is a schematic diagram illustrating another movement of the exit roller pair 113 in the main scanning direction. After the tilt correcting operation of the cleaning sheet is performed in the laminating device 200, the conveyance of the cleaning sheet is restarted. After that, the controller 500 of the laminating device 200 causes the sheet end detection sensor C10 to detect the sheet ends and calculate the correction amount in the main scanning direction of the cleaning sheet. The controller 500 of the laminating device 200 then causes the exit roller pair 113 to move in the main scanning direction so as to change the position of the cleaning sheet in the main scanning direction.

In FIG. 22A, the controller 500 of the laminating device 200 causes the exit roller pair 113 upward to move the cleaning sheet from the original broken line position to the solid line position. The upper end position indicated by the solid line is, for example, located so that the cleaning sheet passes through one end of the heat pressing roller 120. In FIG. 22B, the controller 500 of the laminating device 200 causes the exit roller pair 113 downward to move the cleaning sheet from the original broken line position to the solid line position. The lower end position indicated by the solid line is, for example, located so that the cleaning sheet passes through the other end of the heat pressing roller 120. Note that, when the cleaning sheet is moved in the main scanning direction, the entrance roller pair 108 is separated from the cleaning sheet so as not to interfere with the movement of the cleaning sheet.

The above operation is repeated such that the subsequent cleaning sheet is conveyed at a position different from the position of the preceding sheet in the orthogonal to the cleaning sheet conveyance direction. Note that, an image detection by the image sensor is used to detect the sheet end by the sheet end detection sensor C10. However, an optical sensor such as an ultrasonic sensor or a distance measurement sensor that can determine the distance from the cleaning sheet may be used as the sheet end detection sensor C10.

Figure 23A:
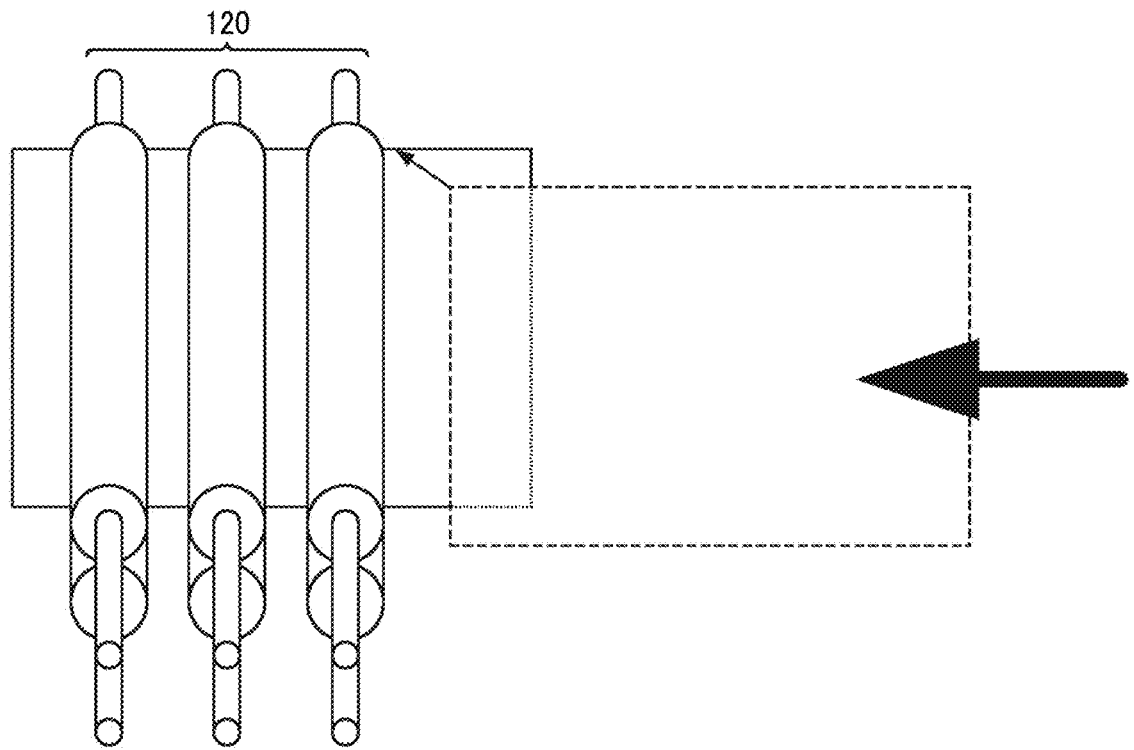
FIG. 23A is a schematic diagram illustrating relative positions of a heat pressing roller and the cleaning sheet in a case in which the cleaning sheet is conveyed through the upper end of the heat pressing roller.
Figure 23B:
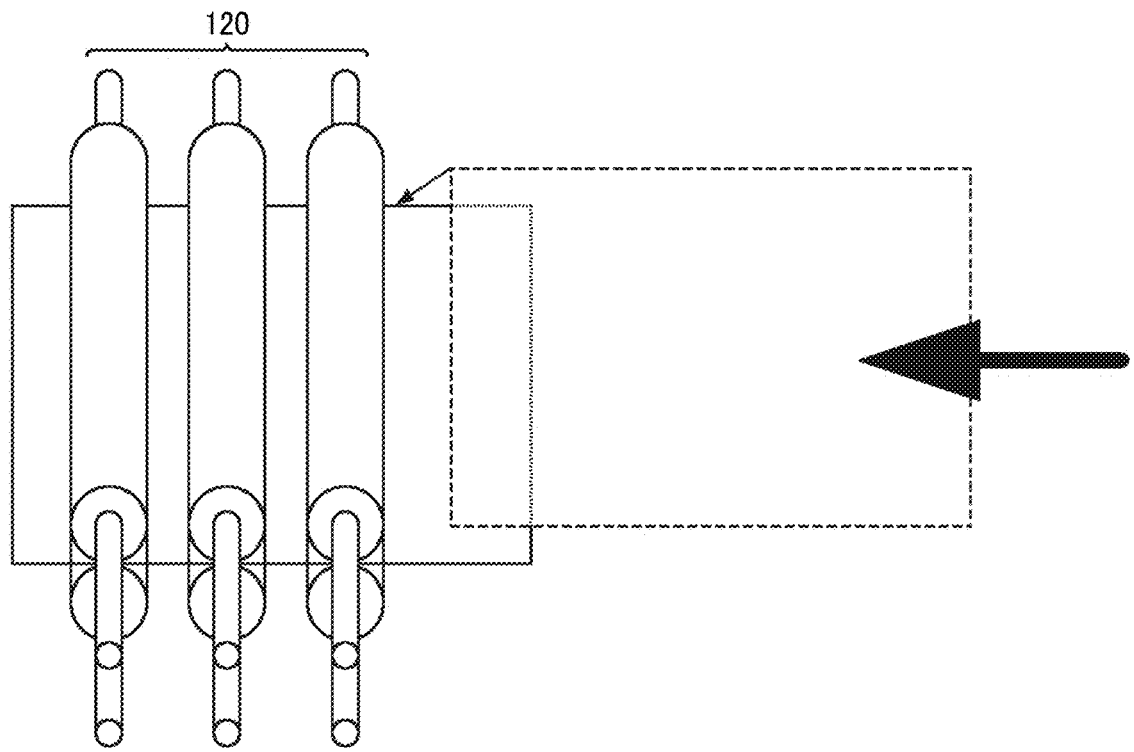
FIG. 23B is a schematic diagram illustrating relative positions of the heat pressing roller and the cleaning sheet in a case in which the cleaning sheet is conveyed through the lower end of the heat pressing roller.

FIGS. 23A and 23B are schematic diagrams illustrating relative positions of the heat pressing roller 120 and the cleaning sheet.

In the laminating device 200, since the lamination sheet S is adhered by the heat pressing roller 120 under heat and pressure, a glue sticking out of the lamination sheet S and a dust caught together with the lamination sheet S adhere to the heat pressing roller 120.

However, as described above, the cleaning sheet can be conveyed to the heat pressing roller 120 in a range equal to or larger than the width of the lamination sheet S (laminating film) to remove stains and dust. In FIG. 23A, the cleaning sheet is conveyed through the upper end of the heat pressing roller 120. The position of the cleaning sheet in FIG. 23A corresponds to the solid line position in FIG. 22A. In FIG. 23B, the cleaning sheet is conveyed through the lower end of the heat pressing roller 120. The position of the cleaning sheet in FIG. 23B corresponds to the solid line position in FIG. 22B. Accordingly, a breakdown of the laminating device 200 that may be caused by the lamination sheet S caught by the stains and dust on the heat pressing roller 120 is prevented.

According to the laminating device 200 in the present embodiment, the subsequent cleaning sheet is moved to a position different from the position of the preceding sheet in the direction orthogonal to the cleaning sheet conveyance direction in the sheet conveyance passage after being fed. Such a configuration eliminates the time and labors for moving the subsequent cleaning sheet to a position different from the position of the preceding cleaning sheet to clean the heat pressing roller 120 in a range equal to or larger than the width of the lamination sheet S.

FIG. 24 is a schematic diagram illustrating an overall configuration the laminating device 200 including the sheet processing device 100 according to an embodiment of the present disclosure. The laminating device 200 in the present embodiment includes the sheet feed tray 102 as a first loader on which the inner sheets P or the lamination sheets S are loaded, the pickup roller 105 that feeds the inner sheet P or the lamination sheet S from the sheet feed tray 102, the conveying roller pair 107, and the sheet conveyance passage to reverse the inner sheet P or the lamination sheet S. The laminating device 200 in the present embodiment further includes, below the sheet feed tray 102, the sheet feed tray 103 as a second loader on which the inner sheets P or the lamination sheets S are loaded, a pickup roller 154 that feeds the inner sheet P or the lamination sheet S from the sheet feed tray 103, a conveying roller pair 155, and a sheet conveyance passage defined by some inner components of the laminating device 200 to reverse the inner sheet P or the lamination sheet S. These sheet conveyance passages meet upstream from the entrance roller pair 108.

The sheet end detection sensors C6 and C7 for detecting an end of the inner sheet P are disposed on the back side of the sheet feed tray 102 of the laminating device 200. Sheet end detection sensor C8 and C9 for detecting an end of the inner sheet P are disposed on the back side of the sheet feed tray 103 of the laminating device 200. FIG. 24 illustrates a state in which the inner sheet P fed from the sheet feed tray 103 is conveyed and sandwiched between the lamination sheet S fed from the sheet feed tray 102.

Figure 25:
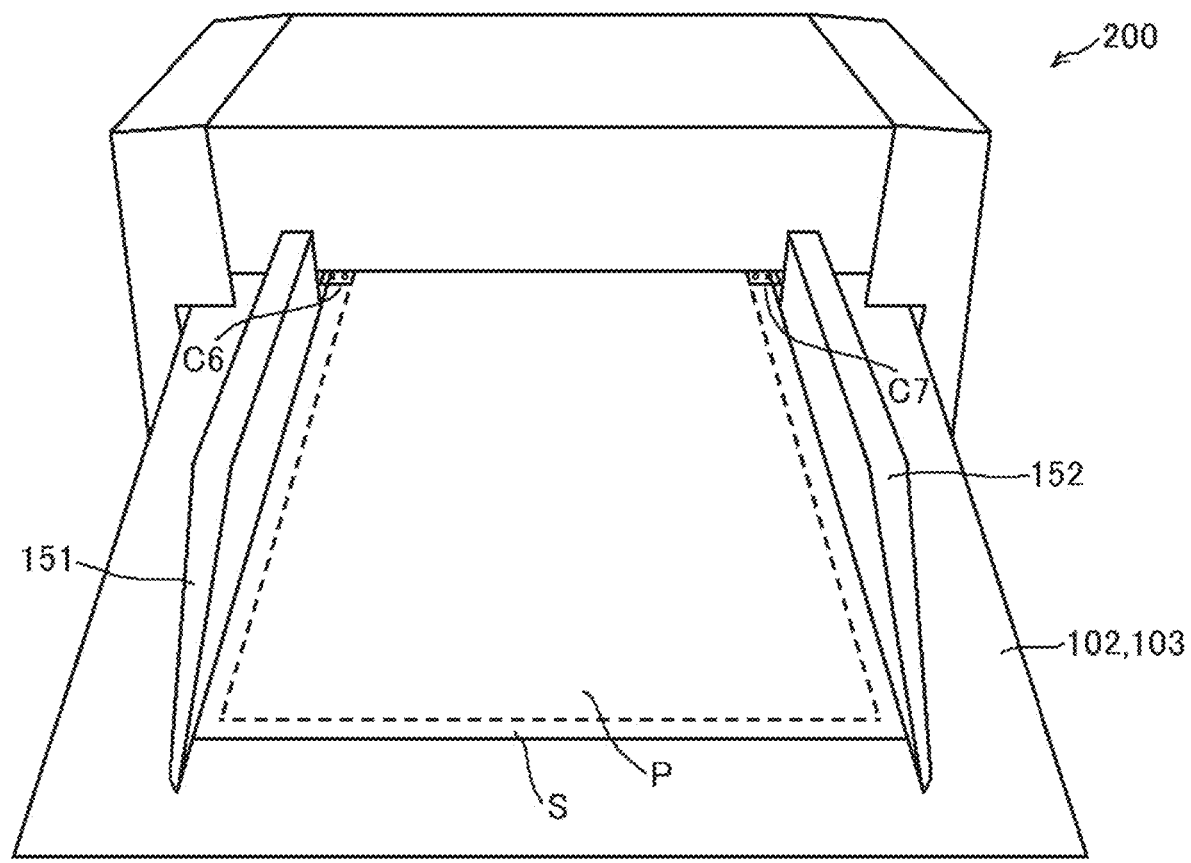
FIG. 25 is a schematic diagram illustrating a general arrangement of the sheet feed trays on which the inner sheets or the lamination sheets are loaded.

FIG. 25 is a schematic diagram illustrating a general arrangement of the sheet feed trays 102 and 103 on which the inner sheets P or the lamination sheets S are loaded. In the laminating device 200, since the inner sheet P needs to wait until the separating operation of the lamination sheet S is completed, the inner sheet P is fed in advance separately from the lamination sheet S and stands by in the sheet conveyance passage that allows the inner sheet P to be reversed and that ensures a standby distance. The end in the main scanning direction of the inner sheet P, the cleaning sheet, or the lamination sheet S is detected by the sheet end detection sensors C6, C7, C8 and C9. Since the lamination sheet S is a conveyed as an object having the maximum width detected by the sheet end detection sensors C6, C7, C8, and C9, it can be determined that the object to be conveyed is the inner sheet P or the cleaning sheet other than the lamination sheet S in a case where the sheet end detection sensors C6, C7, C8, and C9 detect no end. As the detection sensor for detecting the end, an optical sensor such as a reflective sensor or a transmissive sensor using a feeler can be used. Alternatively, an image sensor may be used to detect an image.

By using such a configuration, the user can set the lamination sheet S or the inner sheet P on any sheet feed tray without distinguishing a plurality of sheet feed trays. The lamination sheet S in which the inner sheet P has been inserted is ejected onto the sheet ejection tray 104 by the exit roller pair 113 or a roller disposed downstream from the exit roller pair 113 in order of the sheets stacked on the sheet feed trays 102 and 103. Thus, the lamination sheets S lie stacked on the sheet ejection tray 104.

Figure 26:
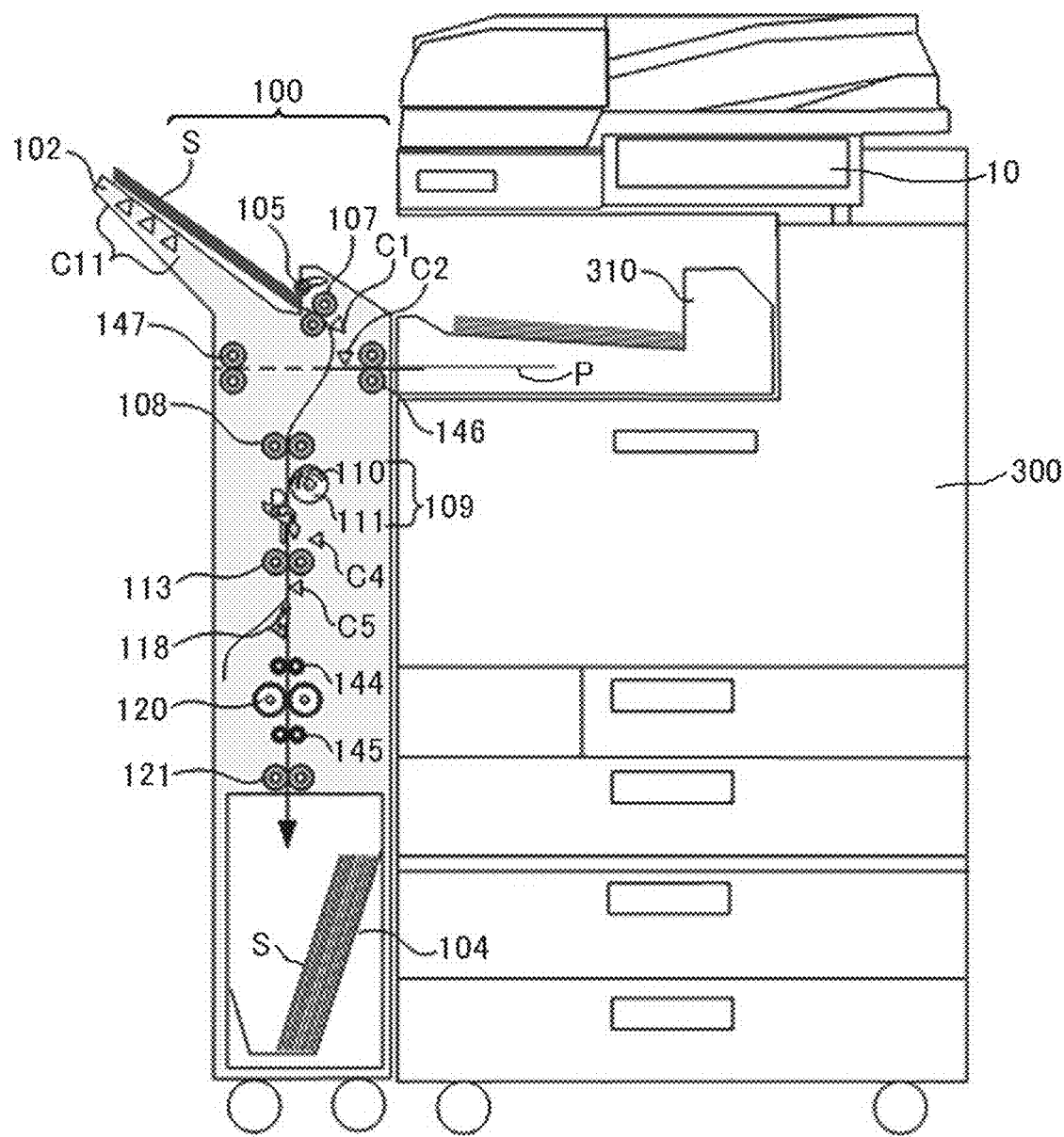
FIG. 26 is a view of an image forming apparatus according to an embodiment of the present disclosure.

FIG. 26 is a schematic view of an image forming apparatus according to an embodiment of the present disclosure. An image forming apparatus 300 includes the sheet processing device 100 or the laminating device 200 on a side of the image forming apparatus 300. In the following description, parts having similar functions to those of the parts of the above-described apparatus or device are given the same reference numerals as the reference numerals given to the identical or corresponding parts of the above-described apparatus. Redundant description of these parts is omitted as appropriate. The sheet processing device 100 or the laminating device 200 includes the sheet feed tray 102 that stacks the lamination sheets S. The inner sheet P can be fed from a relay device 310 of the image forming apparatus 300. A desired image is printed on the inner sheet P to be inserted into the lamination sheet S by a method utilizing a copier or a printer of the image forming apparatus 300. The inner sheet P is insertable in an in-line manner.

In the sheet processing device 100, a plurality of sheet size sensors C11 for detecting the size of the lamination sheet S is disposed on the sheet feed tray 102. Conveying roller pairs 144 and 145 are disposed before and after the heat pressing roller 120 in the sheet conveyance direction.

Figure 27:
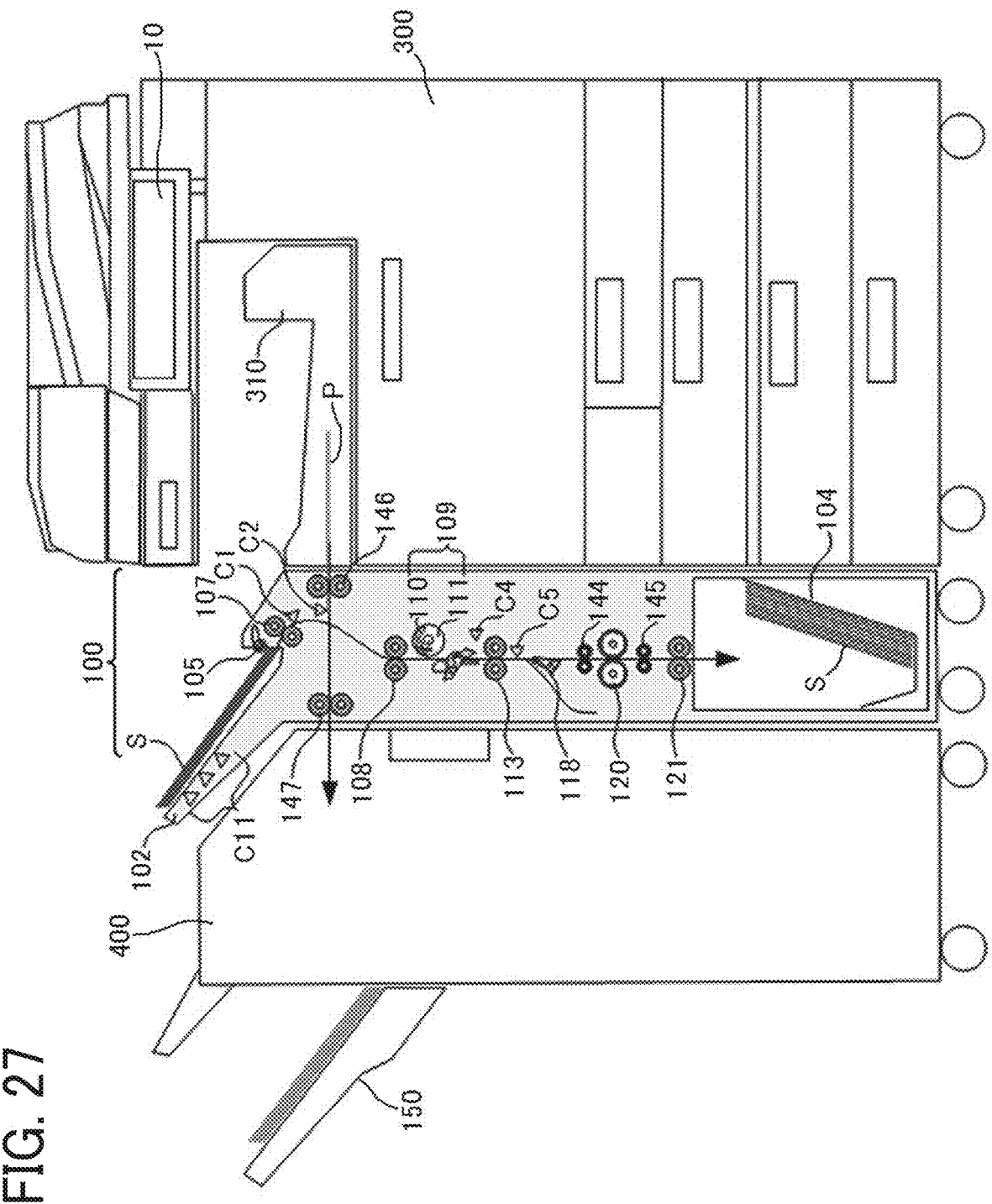
FIG. 27 is a schematic diagram illustrating a configuration of an image forming system including an image forming apparatus, a relay device, a sheet processing device, and a post-processing apparatus according to an embodiment of the present disclosure.

FIG. 27 is a schematic diagram illustrating a configuration of an image forming system including the image forming apparatus 300, the relay device 310, the sheet processing device 100 (or the laminating device 200), and a post-processing apparatus 400. The image forming system according to the present embodiment can feed the inner sheet P from the image forming apparatus 300 via the relay device 310. With the post-processing apparatus 400, as a post-processing apparatus other than the sheet processing device 100 (or the laminating device 200), disposed downstream from the image forming apparatus 300, the user can use the image forming system without reducing the efficiency of print jobs in which the laminate processing is not performed.

In the case of a print job in which laminate processing is not performed, the inner sheet P fed from the image forming apparatus 300 is received by an entrance roller pair 146 of the sheet processing device 100 and conveyed to the post-processing apparatus 400 located downstream from the sheet processing device 100 by an ejection roller pair 147 located downstream from the entrance roller pair 146 in the sheet conveyance direction. The post-processing apparatus 400 can perform post-processing such as staple processing on a sheet material N that has not been subjected to laminate processing. The inner sheets P are stacked on a sheet ejection tray 150 of the post-processing apparatus 400.

In the sheet processing device 100, a plurality of sheet size sensors C11 for detecting the size of the lamination sheet S is disposed on the sheet feed tray 102. Conveying roller pairs 144 and 145 are disposed before and after the heat pressing roller 120 in the sheet conveyance direction.

An embodiment described in relation to FIGS. 16 to 23B in which a subsequent cleaning sheet of a plurality of cleaning sheets is conveyed at a position different from a position of a preceding cleaning sheet of the plurality of cleaning sheets in the direction orthogonal to the conveyance direction of the preceding cleaning sheet can be implemented also in the configuration illustrated in each of FIGS. 24 to 27.

Next, a description is given of a series of operations for cleaning the entire roller with reference to the flowcharts illustrated in FIGS. 28 to 31. The series of operations include conveying a subsequent cleaning sheet of a plurality of cleaning sheets from a position different from a position of a preceding cleaning sheet of the plurality of cleaning sheets in the direction orthogonal to the cleaning sheet conveying direction to the end portion of the heat pressing roller 120.

Figures 28, 28A:
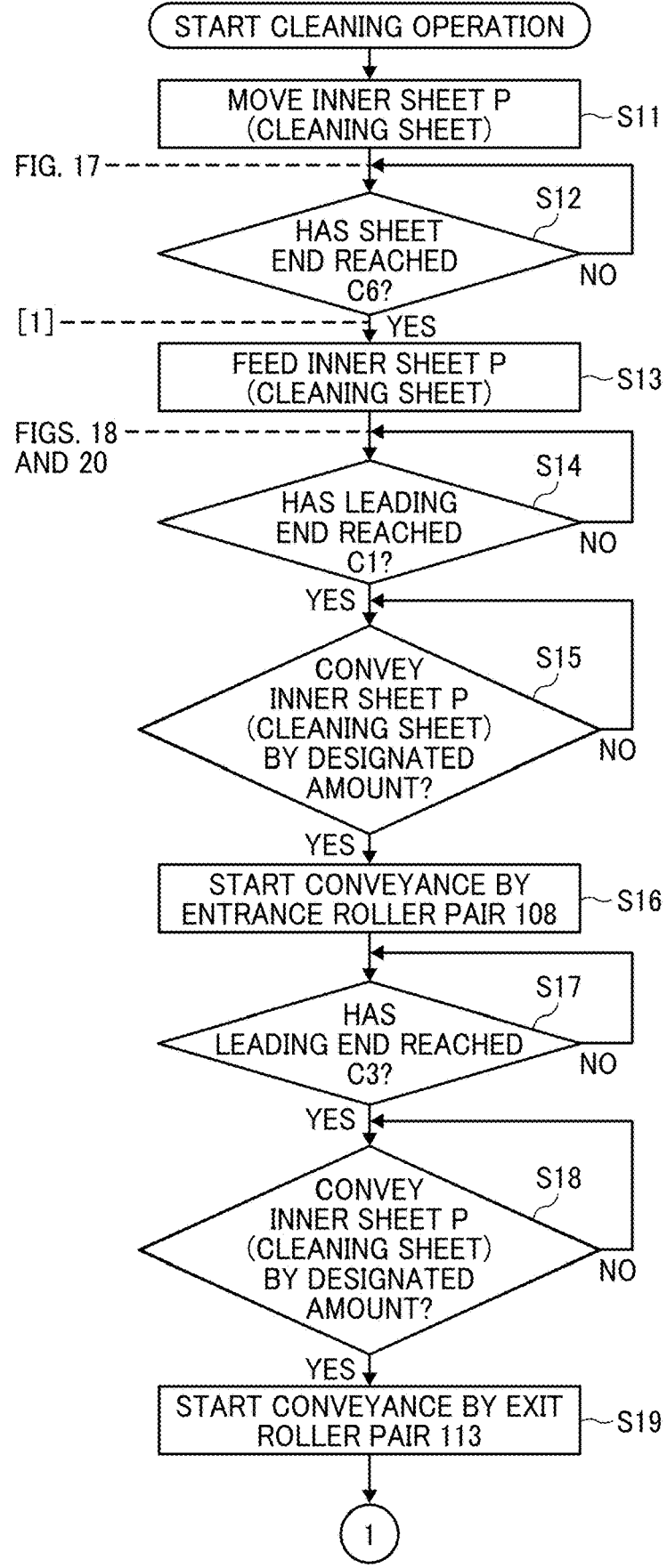
FIG. 28 (FIGS. 28A and 28B) is a flowchart illustrating a series of operations (pre-conveyance position movement) of moving the position of the cleaning sheet in the main scanning direction before conveying the cleaning sheet by using the sheet feed tray in the configuration illustrated in each of FIGS. 15, 26, and 27.
Figure 28B:
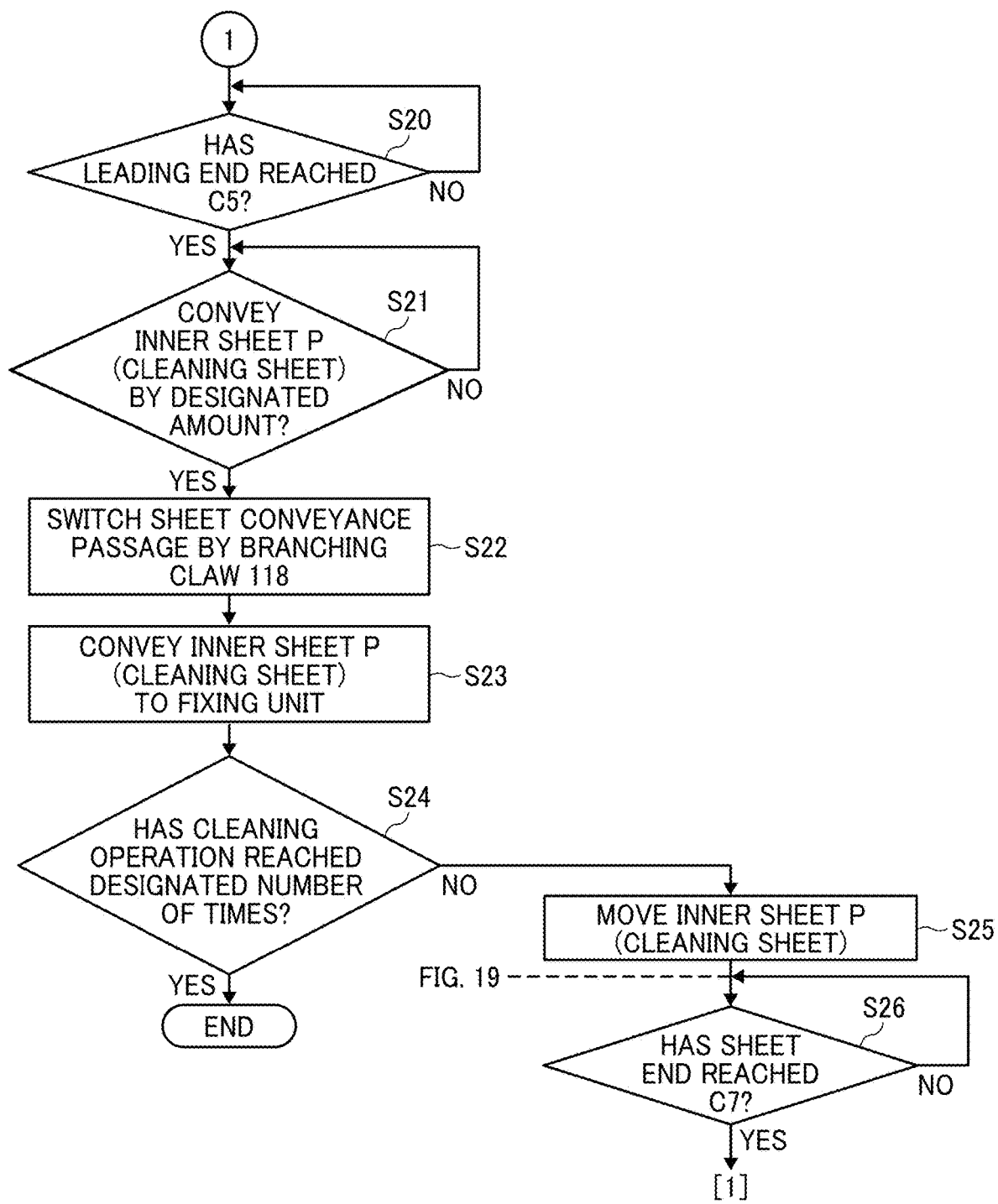

FIG. 28 (FIGS. 28A and 28B) is a flowchart illustrating a series of operations (pre-conveyance position movement) of moving the position of the cleaning sheet in the main scanning direction before conveying the cleaning sheet by using the sheet feed tray 102 in the configuration illustrated in each of FIGS. 15, 26, and 27. When a cleaning operation is started, in step S11 of FIG. 28, the controller 500 of the sheet processing device 100 causes the jogger 152 to start the moving operation of the inner sheet P (cleaning sheet) (see FIG. 17). Then in step S12 of FIG. 28, the controller 500 of the sheet processing device 100 determines whether the left end of the inner sheet P (cleaning sheet) has reached the sheet end detection sensor C6 based on the detection result of the sheet end detection sensor C6. When the left end of the inner sheet P (cleaning sheet) has not reached the sheet end detection sensor C6 (NO in step S12 of FIG. 28), step S12 of FIG. 28 is repeated until the left end of the inner sheet P (cleaning sheet) reaches the sheet end detection sensor C6. By contrast, when the left end of the inner sheet P (cleaning sheet) has reached the sheet end detection sensor C6 (YES in step S12 of FIG. 28), in step S13 of FIG. 28, the controller 500 of the sheet processing device 100 causes the pickup roller 105 to start the feeding operation of the inner sheet P (cleaning sheet) (see FIGS. 18 and 20). Next, in step S14 of FIG. 28, the controller 500 of the sheet processing device 100 determines whether the leading end of the inner sheet P (cleaning sheet) has reached the conveyance sensor C1 based on the detection result of the conveyance sensor C1. When the leading end of the inner sheet P (cleaning sheet) has not reached the conveyance sensor C1 (NO in step S14 of FIG. 28), step S14 of FIG. 28 is repeated until the leading end of the inner sheet P (cleaning sheet) reaches the conveyance sensor C1. By contrast, when the leading end of the inner sheet P (cleaning sheet) has reached the conveyance sensor C1 (YES in step S14 of FIG. 28), the process goes on to step S15. In step S15 of FIG. 28, the controller 500 of the sheet processing device 100 determines whether the inner sheet P (cleaning sheet) has been conveyed by a designated amount from the conveyance sensor C1. When the inner sheet P (cleaning sheet) has not been conveyed by the designated amount from the conveyance sensor C1 (NO in step S15 of FIG. 28), step S15 of FIG. 28 is repeated until the inner sheet P (cleaning sheet) is conveyed by the designated amount from the conveyance sensor C1. By contrast, when the inner sheet P (cleaning sheet) has been conveyed by the designated amount from the conveyance sensor C3 (YES in step S15 of FIG. 28), in step S16 of FIG. 28, the controller 500 of the sheet processing device 100 causes the entrance roller pair 108 to start conveying the inner sheet P (cleaning sheet).

Next, in step S17 of FIG. 28, the controller 500 of the sheet processing device 100 determines whether the leading end of the inner sheet P (cleaning sheet) has reached the conveyance sensor C3 based on the detection result of the conveyance sensor C3. When the leading end of the inner sheet P (cleaning sheet) has not reached the conveyance sensor C3 (NO in step S17 of FIG. 28), step S17 of FIG. 28 is repeated until the leading end of the inner sheet P (cleaning sheet) reaches the conveyance sensor C3. By contrast, when the leading end of the inner sheet P (cleaning sheet) has reached the conveyance sensor C3 (YES in step S17 of FIG. 28), the process goes on to step S18. In step S18 of FIG. 28, the controller 500 of the sheet processing device 100 determines whether the inner sheet P (cleaning sheet) has been conveyed by a designated amount from the conveyance sensor C3. When the inner sheet P (cleaning sheet) has not been conveyed by the designated amount from the conveyance sensor C3 (NO in step S18 of FIG. 28), step S18 of FIG. 28 is repeated until the inner sheet P (cleaning sheet) is conveyed by the designated amount from the conveyance sensor C3. By contrast, when the inner sheet P (cleaning sheet) has been conveyed by the designated amount from the conveyance sensor C3 (YES in step S18 of FIG. 28), in step S19 of FIG. 28 the controller 500 of the sheet processing device 100 causes the exit roller pair 113 to start conveying the inner sheet P (cleaning sheet). Next, in step S20 of FIG. 28, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S20 of FIG. 28), step S20 of FIG. 28 is repeated until the leading end of the inner sheet P (cleaning sheet) reaches the conveyance sensor C5. By contrast, when the leading end of the inner sheet P (cleaning sheet) has reached the conveyance sensor C5 (YES in step S20 of FIG. 28), the process goes on to step S21. In step S21 of FIG. 28, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S21 of FIG. 28), step S21 of FIG. 28 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S21 of FIG. 28), in step S22 of FIG. 28, the controller 500 of the sheet processing device 100 causes the branching claw 118 to switch the sheet conveyance passage to the fixing passage 128. Then, in step S23 of FIG. 28, the controller 500 of the sheet processing device 100 causes the exit roller pair 113 to convey the inner sheet P (cleaning sheet) to the fixing unit including the heat pressing roller 120. As a result, the inner sheet P (cleaning sheet) cleans an area including one end of the heat pressing roller 120.

In step S24 of FIG. 28, the controller 500 of the sheet processing device 100 determines whether the cleaning operation has reached a designated number of times. When the cleaning operation has reached the designated number of times (YES in step S24 of FIG. 28), the cleaning operation ends. By contrast, when the cleaning operation has not reached the designated number of times (NO in step S24 of FIG. 28), in step S25 of FIG. 28, the controller 500 of the sheet processing device 100 performs the next moving operation of inner sheet P (cleaning sheet) (see FIG. 19). Next, in step S26 of FIG. 28, the controller 500 of the sheet processing device 100 determines whether the right end of the inner sheet P (cleaning sheet) has reached the conveyance sensor C7 based on the detection result of the sheet end detection sensor C7. When the right end of the inner sheet P (cleaning sheet) has not reached the sheet end detection sensor C7 (NO in step S26 of FIG. 28), step S26 of FIG. 28 is repeated until the right end of the inner sheet P (cleaning sheet) reaches the sheet end detection sensor C7. By contrast, when the right end of the inner sheet P (cleaning sheet) has reached the sheet end detection sensor C7 (YES in step S26 of FIG. 28), the controller 500 of the sheet processing device 100 returns to the operation flow indicated by [1] in FIG. 28 and repeats the operations after step S13 until the cleaning operation is completed. The inner sheet P (cleaning sheet) also cleans an area including the other end of the heat pressing roller 120 by being conveyed at the position detected by the sheet end detection sensor C7.

Figures 29, 29A:
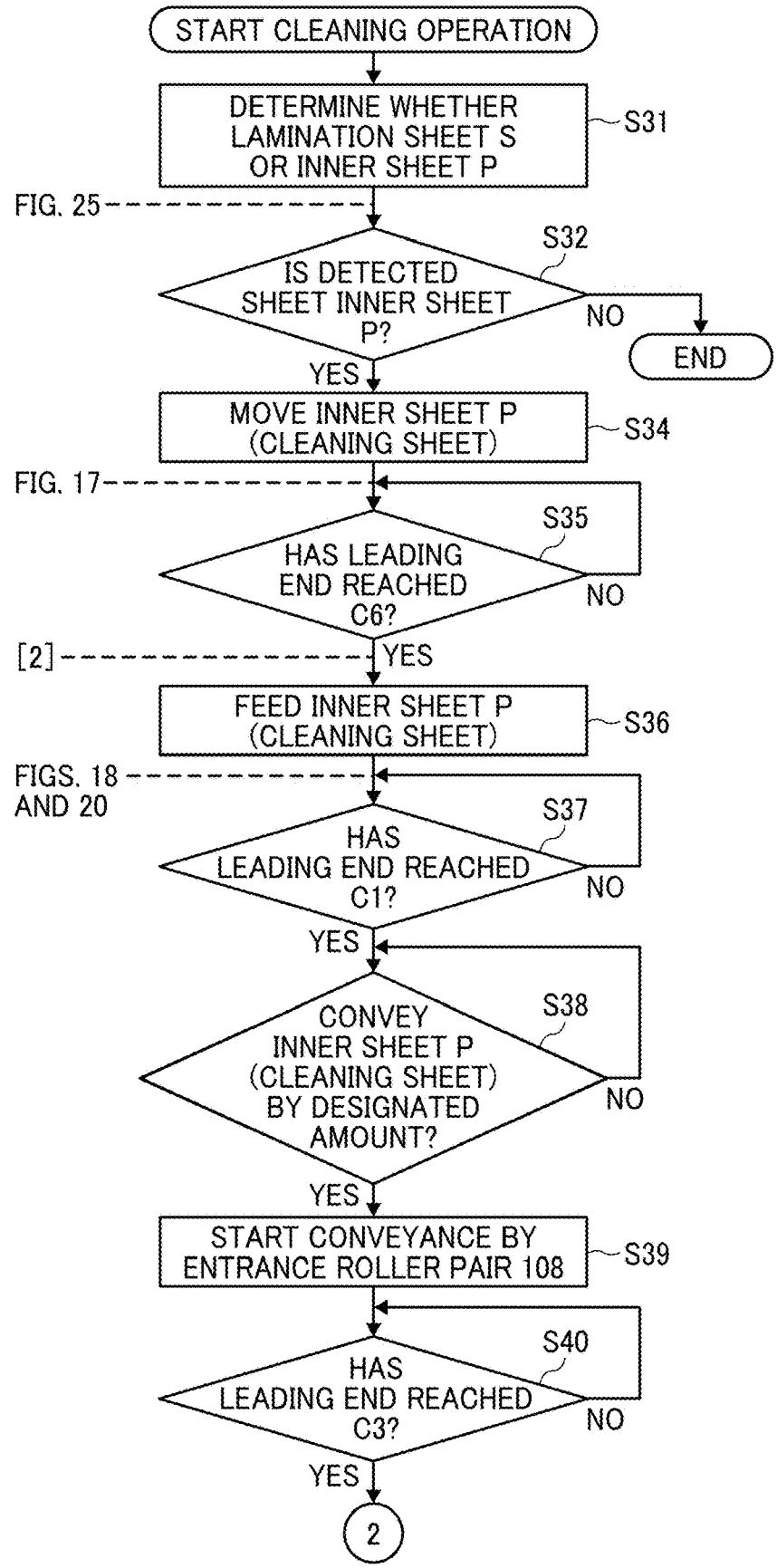
FIG. 29 (FIGS. 29A and 29B) is a flowchart illustrating a series of operations (pre-conveyance position movement) of moving the position of the cleaning sheet in the main scanning direction before conveying the cleaning sheet by using the sheet feed tray in the configuration illustrated in each of FIGS. 21 and 24.
Figure 29B:
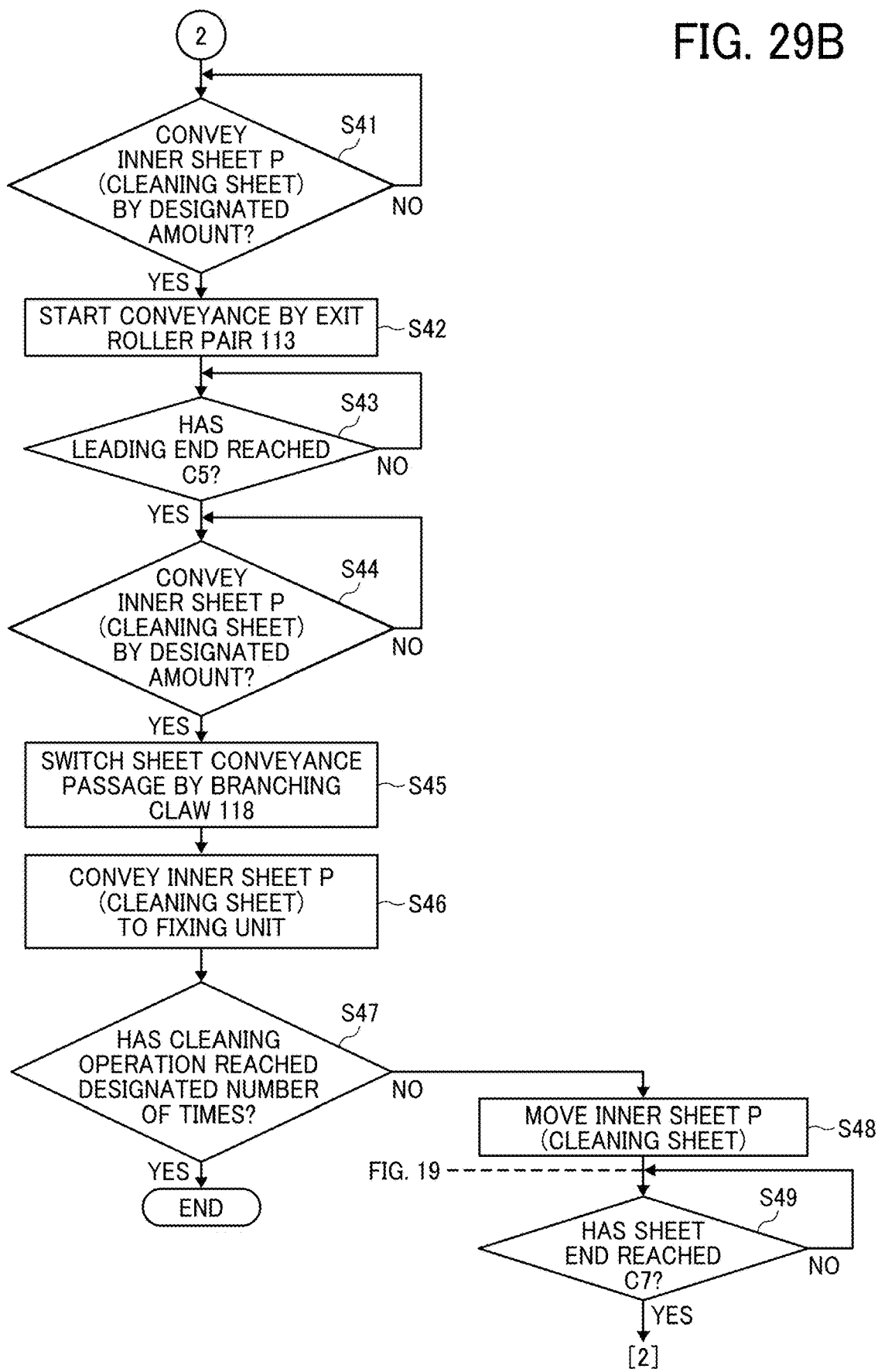

FIG. 29 (FIGS. 29A and 29B) is a flowchart illustrating a series of operations (pre-conveyance position movement) of moving the position of the cleaning sheet in the main scanning direction before conveying the cleaning sheet using the sheet feed tray 102 in the configuration illustrated in each of FIGS. 21 and 24. Since substantially the same operations as the operations described above are performed in a case of the sheet feed tray 103, the description thereof is omitted. When the cleaning operation in started, in step S31 in FIG. 29, the controller 500 of the sheet processing device 100 determines whether objects to be conveyed stacked on the sheet feed tray 102 are the lamination sheets S or the inner sheets P (cleaning sheets) (see FIG. 25). When the objects to be conveyed are not the inner sheets P (cleaning sheet) (NO in step S32 in FIG. 29), the cleaning operation ends in step S33 in FIG. 29. By contrast, when the objects to be conveyed are the inner sheets P (cleaning sheets) (YES in step S32 in FIG. 29), in step S34 of FIG. 29, the controller 500 of the sheet processing device 100 starts the moving operation of the inner sheet P (cleaning sheet) (see FIG. 17). Then in step S35 of FIG. 29, the controller 500 of the sheet processing device 100 determines whether the left end of the inner sheet P (cleaning sheet) has reached the sheet end detection sensor C6 based on the detection result of the sheet end detection sensor C6. When the left end of the inner sheet P (cleaning sheet) has not reached the sheet end detection sensor C6 (NO in step S35 of FIG. 29), step S35 of FIG. 29 is repeated until the left end of the inner sheet P (cleaning sheet) reaches the sheet end detection sensor C6. By contrast, when the left end of the inner sheet P (cleaning sheet) has reached the sheet end detection sensor C6 (YES in step S35 of FIG. 29), in step S36 of FIG. 29 (see FIGS. 18 and 20), the controller 500 of the sheet processing device 100 starts the feeding operation of the inner sheet P (cleaning sheet). Next, in step S37 of FIG. 29, the controller 500 of the sheet processing device 100 determines whether the leading end of the inner sheet P (cleaning sheet) has reached the conveyance sensor C1 based on the detection result of the conveyance sensor C1. When the leading end of the inner sheet P (cleaning sheet) has not reached the conveyance sensor C1 (NO in step S37 of FIG. 29), step S37 of FIG. 29 is repeated until the leading end of the inner sheet P (cleaning sheet) reaches the conveyance sensor C1. By contrast, when the leading end of the inner sheet P (cleaning sheet) has reached the conveyance sensor C1 (YES in step S37 of FIG. 29), the process goes on to step S38. In step S38 of FIG. 29, the controller 500 of the sheet processing device 100 determines whether the inner sheet P (cleaning sheet) has been conveyed by a designated amount from the conveyance sensor C1. When the inner sheet P (cleaning sheet) has not been conveyed by the designated amount from the conveyance sensor C1 (NO in step S38 of FIG. 29), step S38 of FIG. 29 is repeated until the inner sheet P (cleaning sheet) is conveyed by the designated amount from the conveyance sensor C1. By contrast, when the inner sheet P (cleaning sheet) has been conveyed by the designated amount from the conveyance sensor C1 (YES in step S38 of FIG. 29), in step S39 of FIG. 29, the controller 500 of the sheet processing device 100 causes the entrance roller pair 108 to start conveying the inner sheet P (cleaning sheet).

Next, in step S40 of FIG. 29, the controller 500 of the sheet processing device 100 determines whether the leading end of the inner sheet P (cleaning sheet) has reached the conveyance sensor C3 based on the detection result of the conveyance sensor C3. When the leading end of the inner sheet P (cleaning sheet) has not reached the conveyance sensor C3 (NO in step S40 of FIG. 29), step S40 of FIG. 29 is repeated until the leading end of the inner sheet P (cleaning sheet) reaches the conveyance sensor C3. By contrast, when the leading end of the inner sheet P (cleaning sheet) has reached the conveyance sensor C3 (Yes in step S40 of FIG. 29), the process goes on to step S41. In step S41 of FIG. 29, the controller 500 of the sheet processing device 100 determines whether the inner sheet P (cleaning sheet) has been conveyed by a designated amount from the conveyance sensor C3. When the inner sheet P (cleaning sheet) has not been conveyed by the designated amount from the conveyance sensor C3 (NO in step S41 of FIG. 29), step S41 of FIG. 29 is repeated until the inner sheet P (cleaning sheet) is conveyed by the designated amount from the conveyance sensor C3. By contrast, when the inner sheet P (cleaning sheet) has been conveyed by the designated amount from the conveyance sensor C3 (YES in step S41 of FIG. 29), in step S42 of FIG. 29, the controller 500 of the sheet processing device 100 causes the exit roller pair 113 to start conveying the inner sheet P (cleaning sheet). Next, in step S43 of FIG. 29, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S43 of FIG. 29), step S43 of FIG. 29 is repeated until the leading end of the inner sheet P (cleaning sheet) reaches the conveyance sensor C5. By contrast, when the leading end of the inner sheet P (cleaning sheet) has reached the conveyance sensor C5 (YES in step S43 of FIG. 29), the process goes on to step S44. In step S44 of FIG. 29, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S44 of FIG. 29), step S44 of FIG. 29 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S44 of FIG. 29), in step S45 of FIG. 29, the controller 500 of the sheet processing device 100 causes the branching claw 118 to switch the sheet conveyance passage to the fixing passage 128. Then, in step S46 of FIG. 29, the controller 500 of the sheet processing device 100 causes the exit roller pair 113 to convey the inner sheet P (cleaning sheet) to the fixing unit including the heat pressing roller 120. As a result, the inner sheet P (cleaning sheet) cleans an area including one end of the heat pressing roller 120.

In step S47 of FIG. 29, the controller 500 of the sheet processing device 100 determines whether the cleaning operation has reached a designated number of times. When the cleaning operation has reached the designated number of times (YES in step S47 of FIG. 29), the cleaning operation ends. By contrast, when the cleaning operation has not reached the designated number of times (NO in step S47 of FIG. 29), in step S48 of FIG. 29, the controller 500 of the sheet processing device 100 performs the next moving operation of the inner sheet P (cleaning sheet) (see FIG. 19). Next, in step S49 of FIG. 29, the controller 500 of the sheet processing device 100 determines whether the right end of the inner sheet P (cleaning sheet) has reached the conveyance sensor C7 based on the detection result of the sheet end detection sensor C7. When the right end of the inner sheet P (cleaning sheet) has not reached the sheet end detection sensor C7 (NO in step S49 of FIG. 29), step S49 of FIG. 29 is repeated until the right end of the inner sheet P (cleaning sheet) reaches the sheet end detection sensor C7. By contrast, when the right end of the inner sheet P (cleaning sheet) has reached the sheet end detection sensor C7 (YES in step S49 of FIG. 29), the controller 500 of the sheet processing device 100 returns to the operation flow indicated by [2] in FIG. 29 and repeats the operations after step S36 until the cleaning operation is completed. The inner sheet P (cleaning sheet) also cleans the area including the other end of the heat pressing roller 120 by being conveyed at the position detected by the sheet end detection sensor C7.

Figure 30A:
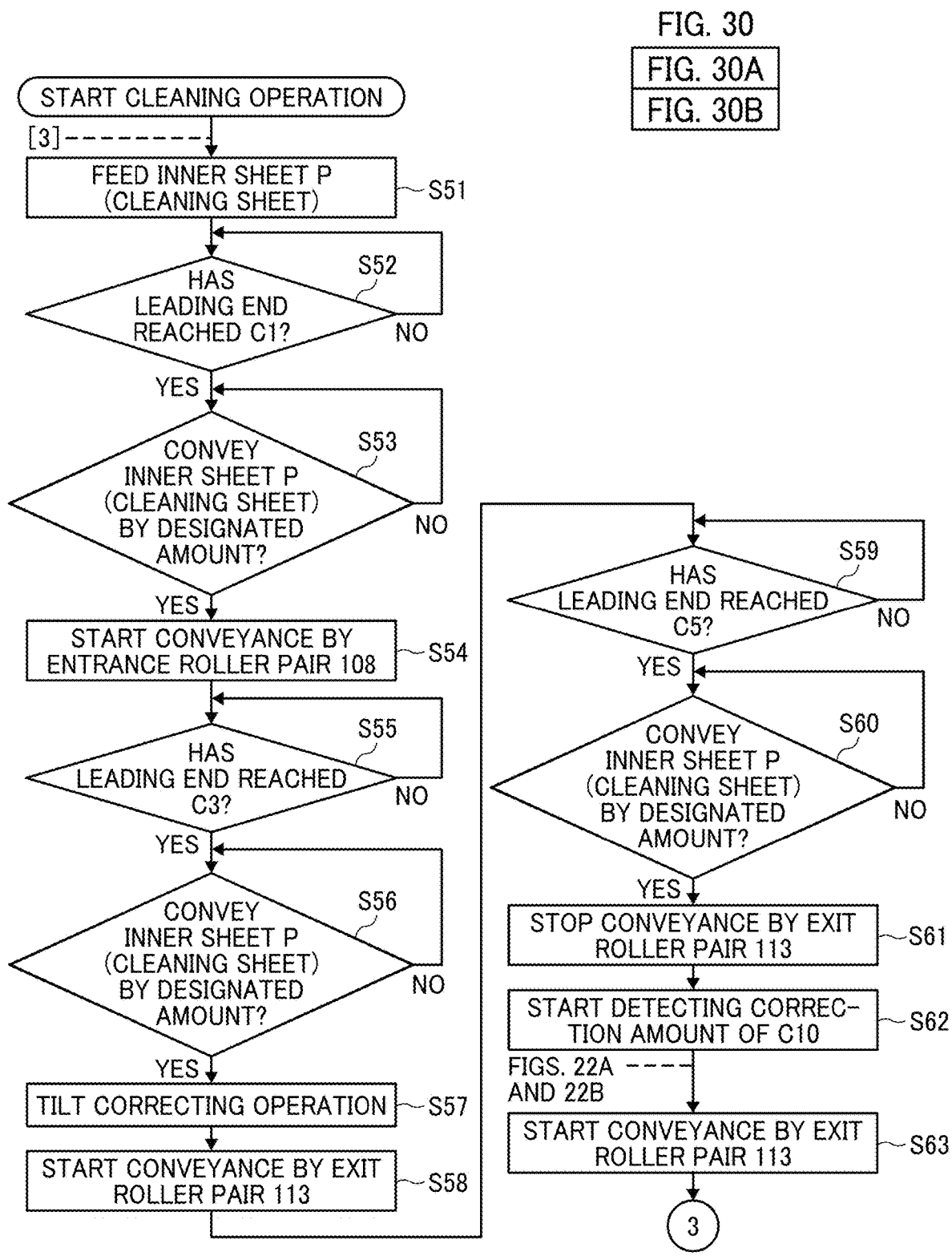
FIG. 30 (FIGS. 30A and 30B) is a flowchart illustrating a movement of the position of the cleaning sheet in the main scanning direction by moving the exit roller pair in the main scanning direction after feeding the cleaning sheet in the configuration illustrated in each of FIGS. 15, 26, and 27, according to an embodiment of the present disclosure.
Figure 30B:
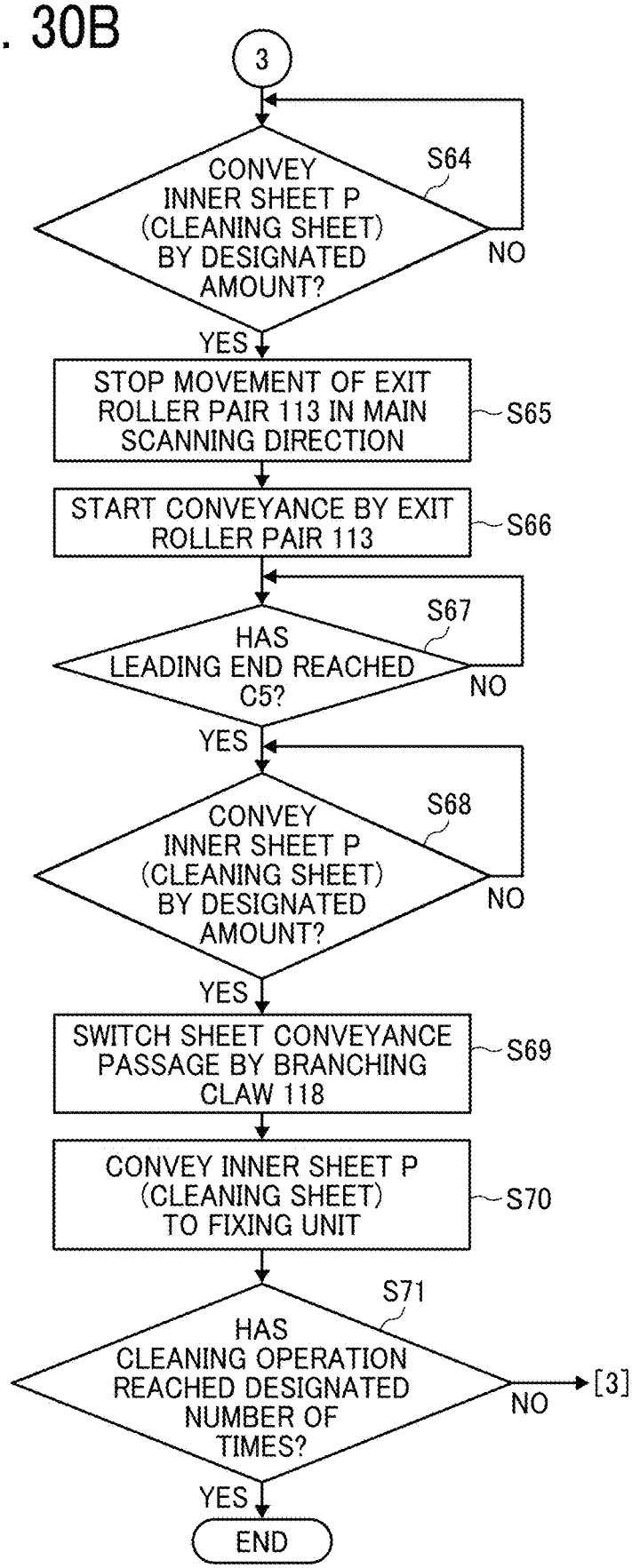

FIG. 30 (FIGS. 30A and 30B) is a flowchart illustrating a movement of the position of the cleaning sheet in the main scanning direction by moving the exit roller pair 113 in the main scanning direction after feeding the cleaning sheet in the configuration illustrated in each of FIGS. 15, 26, and 27. When a cleaning operation is started, in step S51 of FIG. 30, the controller 500 of the sheet processing device 100 causes the pickup roller 105 to start the feeding operation of the inner sheet P (cleaning sheet) (see FIG. 15). Then in step S52 of FIG. 30, the controller 500 of the sheet processing device 100 determines whether the leading end of the inner sheet P (cleaning sheet) has reached the conveyance sensor C1 based on the detection result of the conveyance sensor C1. When the leading end of the inner sheet P (cleaning sheet) has not reached the conveyance sensor C1 (NO in step S52 of FIG. 30), step S52 of FIG. 30 is repeated until the leading end of the inner sheet P (cleaning sheet) reaches the conveyance sensor C1. By contrast, when the leading end of the inner sheet P (cleaning sheet) has reached the conveyance sensor C1 (YES in step S52 of FIG. 30), the process goes on to step S53. In step S53 of FIG. 30, the controller 500 of the sheet processing device 100 determines whether the inner sheet P (cleaning sheet) has been conveyed by a designated amount from the conveyance sensor C1. When the inner sheet P (cleaning sheet) has not been conveyed by the designated amount from the conveyance sensor C1 (NO in step S53 of FIG. 30), step S53 of FIG. 30 is repeated until the inner sheet P (cleaning sheet) is conveyed by the designated amount from the conveyance sensor C1. By contrast, when the inner sheet P (cleaning sheet) has been conveyed by the designated amount from the conveyance sensor C1 (YES in step S53 of FIG. 30), in step S54 of FIG. 30, the controller 500 of the sheet processing device 100 causes the entrance roller pair 108 to start conveying the inner sheet P (cleaning sheet).

Next, when the leading end of the inner sheet P (cleaning sheet) has reached the conveyance sensor C3 (YES in step S55 of FIG. 30), in step S57 in FIG. 30, the controller 500 of the sheet processing device 100 causes the exit roller pair 113 to perform the tilt correcting operation. Next, in step S58 of FIG. 30, the controller 500 of the sheet processing device 100 causes the exit roller pair 113 to start conveying the inner sheet P (cleaning sheet). Then in step S59 of FIG. 30, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S59 of FIG. 30), step S59 of FIG. 30 is repeated until the leading end of the inner sheet P (cleaning sheet) reaches the conveyance sensor C5. By contrast, when the leading end of the inner sheet P (cleaning sheet) has reached the conveyance sensor C5 (YES in step S59 of FIG. 30), the process goes on to step S60. In step S60 of FIG. 30, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S60 of FIG. 30), step S60 of FIG. 30 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S60 of FIG. 30), in step S61 of FIG. 30, the controller 500 of the sheet processing device 100 causes the exit roller pair 113 to stop conveying the inner sheet P (cleaning sheet). Next, in step S62 of FIG. 30, the controller 500 of the sheet processing device 100 causes the sheet end detection sensor C10 to detect a correction amount in the main scanning direction of the inner sheet P (cleaning sheet). Next, in step S63 of FIG. 30, the controller 500 of the sheet processing device 100 causes the exit roller pair 113 to move in the main scanning direction. Then in step S64 of FIG. 30, the controller 500 of the sheet processing device 100 determines whether the inner sheet P (cleaning sheet) has been conveyed by a designated amount. When the inner sheet P (cleaning sheet) has not been conveyed by the designated amount, step S64 of FIG. 30 is repeated until the inner sheet P (cleaning sheet) is conveyed by the designated amount. By contrast, when the inner sheet P (cleaning sheet) has been conveyed by the designated amount and adjusted the lateral registration (YES in step S64 of FIG. 30), in step S65 of FIG. 30, the controller 500 of the sheet processing device 100 causes the exit roller pair 113 to stop movement in the main scanning direction (see FIGS. 22A and 22B).

Next, in step S66 of FIG. 30, the controller 500 of the sheet processing device 100 causes the exit roller pair 113 to start conveying the inner sheet P (cleaning sheet). Then in step S67 of FIG. 30, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S67 of FIG. 30), step S67 of FIG. 30 is repeated until the leading end of the inner sheet P (cleaning sheet) reaches the conveyance sensor C5. By contrast, when the leading end of the inner sheet P (cleaning sheet) has reached the conveyance sensor C5 (YES in step S67 of FIG. 30), the process goes on to step S68. In step S68 of FIG. 30, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S68 of FIG. 30), step S68 of FIG. 30 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S68 of FIG. 30), the process goes on to step S69. Next, in step S69 of FIG. 30, the controller 500 of the sheet processing device 100 causes the branching claw 118 to switch the sheet conveyance passage to the fixing passage 128. Then, in step S70 of FIG. 30, the controller 500 of the sheet processing device 100 causes the exit roller pair 113 to convey the inner sheet P (cleaning sheet) to the fixing unit including the heat pressing roller 120. In step S71 of FIG. 30, the controller 500 of the sheet processing device 100 determines whether the cleaning operation has reached a designated number of times. When the cleaning operation has reached the designated number of times (YES in step S71 of FIG. 30), the cleaning operation ends. By contrast, when the cleaning operation has not reached the designated number of times (NO in step S71 of FIG. 30), the controller 500 of the sheet processing device 100 returns to the operation flow indicated by [3] in FIG. 30 and repeats the operations after step S51 until the cleaning operation is completed.

Figures 31, 31A, 31B:
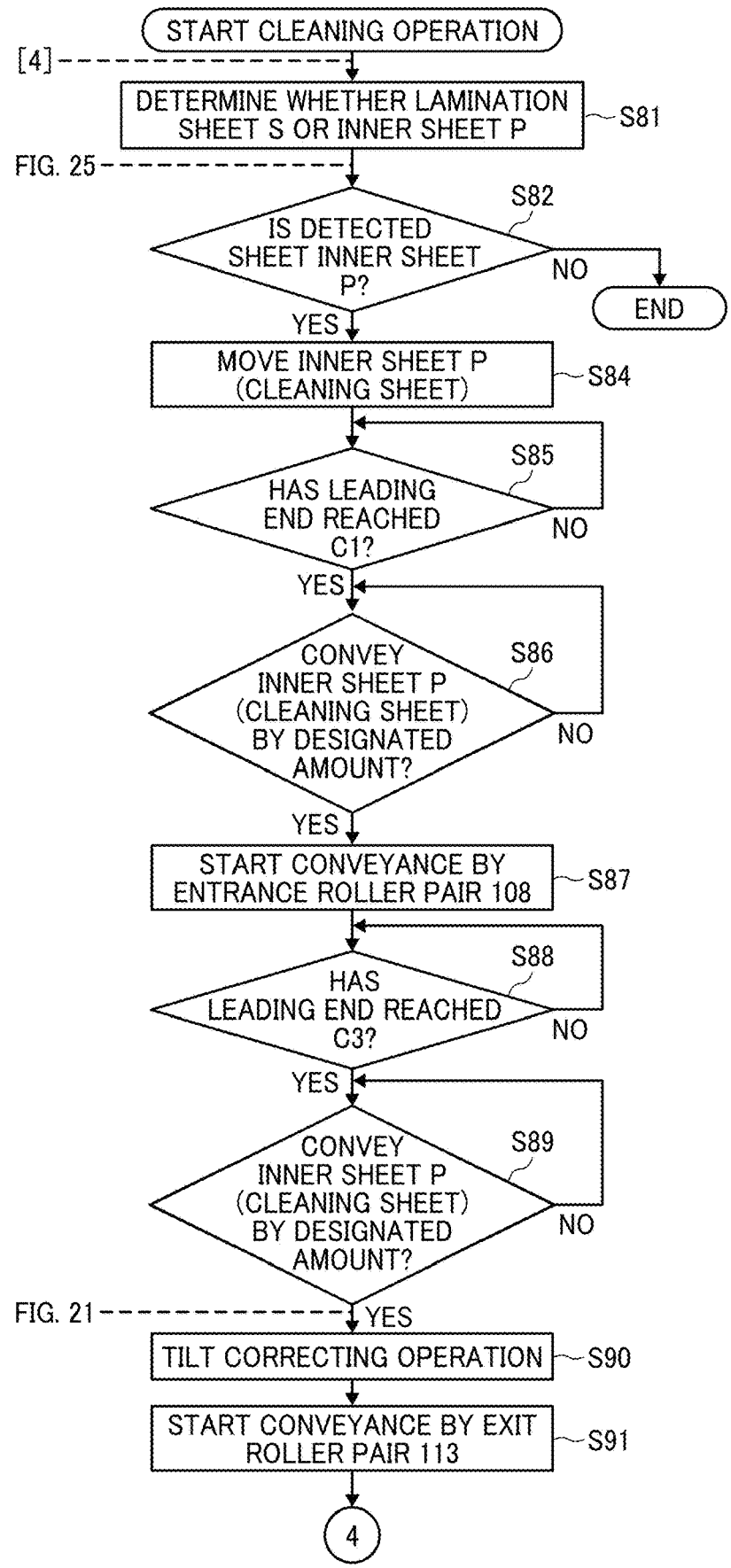
FIG. 31 (FIGS. 31A and 31B) is a flowchart illustrating a movement of the position of the cleaning sheet in the main scanning direction by moving the exit roller pair in the main scanning direction after feeding the cleaning sheet in the configuration illustrated in each of FIGS. 21 and 24, according to an embodiment of the present disclosure.
Figure 31B:
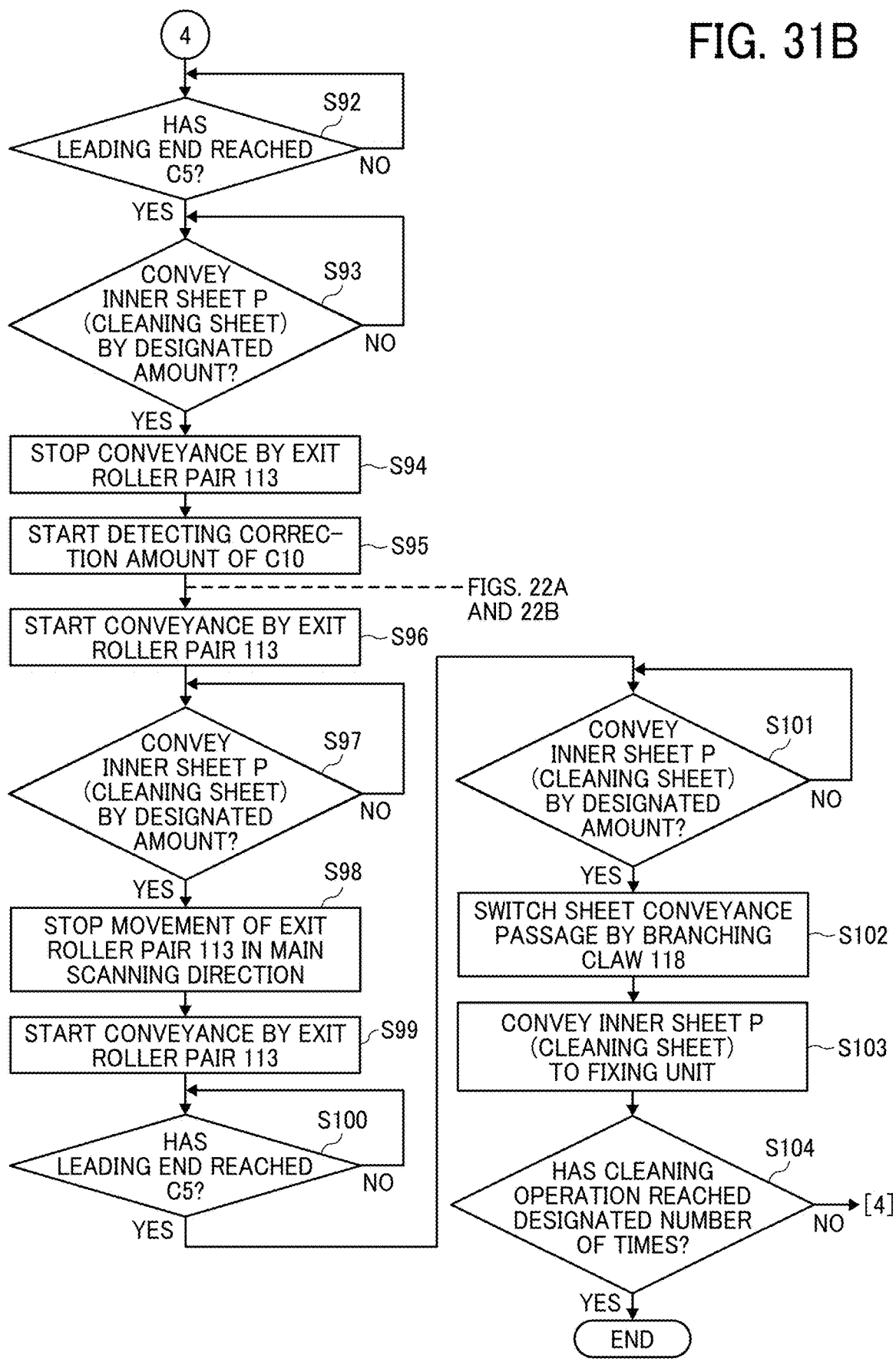

FIG. 31 (FIGS. 31A and 31B) is a flowchart illustrating a movement of the position of the cleaning sheet in the main scanning direction by moving the exit roller pair 113 in the main scanning direction after feeding the cleaning sheet in the configuration illustrated in each of FIGS. 21 and 24. Since substantially the same operations as the operations described above are performed in a case of the sheet feed tray 103, the description thereof is omitted. When the cleaning operation in started, in step S81 in FIG. 31, the controller 500 of the sheet processing device 100 determines whether the objects to be conveyed stacked in the sheet feed tray 102 are the lamination sheets S or the inner sheets P (cleaning sheets) (see FIG. 25). When the objects to be conveyed are not the inner sheet P (cleaning sheet) (NO in step S82 in FIG. 31), the cleaning operation ends in step S83 in FIG. 31. By contrast, when the objects to be conveyed are the inner sheets P (cleaning sheets) (YES in step S82 in FIG. 31), in step S84 of FIG. 31, the controller 500 of the sheet processing device 100 starts the moving operation of the inner sheet P (cleaning sheet). Next, in step S85 of FIG. 31, the controller 500 of the sheet processing device 100 determines whether the leading end of the inner sheet P (cleaning sheet) has reached the conveyance sensor C1 based on the detection result of the conveyance sensor C1. When the leading end of the inner sheet P (cleaning sheet) has not reached the conveyance sensor C1 (NO in step S85 of FIG. 31), step S85 of FIG. 31 is repeated until the leading end of the inner sheet P (cleaning sheet) reaches the conveyance sensor C1. By contrast, when the leading end of the inner sheet P (cleaning sheet) has reached the conveyance sensor C1 (YES in step S85 of FIG. 31), the process goes on to step S86. In step S86 of FIG. 31, the controller 500 of the sheet processing device 100 determines whether the inner sheet P (cleaning sheet) has been conveyed by a designated amount from the conveyance sensor C1. When the inner sheet P (cleaning sheet) has not been conveyed by the designated amount from the conveyance sensor C1 (NO in step S86 of FIG. 31), step S86 of FIG. 31 is repeated until the inner sheet P (cleaning sheet) is conveyed by the designated amount from the conveyance sensor C1. By contrast, when the inner sheet P (cleaning sheet) has been conveyed by the designated amount from the conveyance sensor C1 (YES in step S86 of FIG. 31), in step S87 of FIG. 31, the controller 500 of the sheet processing device 100 causes the entrance roller pair 108 to start conveying the inner sheet P (cleaning sheet).

Next, in step S88 of FIG. 31, the controller 500 of the sheet processing device 100 determines whether the leading end of the inner sheet P (cleaning sheet) has reached the conveyance sensor C3 based on the detection result of the conveyance sensor C3. When the leading end of the inner sheet P (cleaning sheet) has not reached the conveyance sensor C3 (NO in step S88 of FIG. 31), step S88 of FIG. 31 is repeated until the leading end of the inner sheet P (cleaning sheet) reaches the conveyance sensor C3. By contrast, when the leading end of the inner sheet P (cleaning sheet) has reached the conveyance sensor C3 (YES in step S88 of FIG. 31), the process goes on to step S89. In step S89 of FIG. 31, the controller 500 of the sheet processing device 100 determines whether the inner sheet P (cleaning sheet) has been conveyed by a designated amount from the conveyance sensor C3. When the inner sheet P (cleaning sheet) has not been conveyed by the designated amount from the conveyance sensor C3 (NO in step S89 of FIG. 31), step S89 of FIG. 31 is repeated until the inner sheet P (cleaning sheet) is conveyed by the designated amount from the conveyance sensor C3. By contrast, when the inner sheet P (cleaning sheet) has been conveyed by the designated amount from the conveyance sensor C3 (YES in step S89 of FIG. 31), in step S90 in FIG. 31, the controller 500 of the sheet processing device 100 causes the exit roller pair 113 to perform the tilt correcting operation (see FIG. 21). Next, in step S91 of FIG. 31, the controller 500 of the sheet processing device 100 causes the exit roller pair 113 to start conveying the inner sheet P (cleaning sheet). Then in step S92 of FIG. 31, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S92 of FIG. 31), step S92 of FIG. 31 is repeated until the leading end of the inner sheet P (cleaning sheet) reaches the conveyance sensor C5. By contrast, when the leading end of the inner sheet P (cleaning sheet) has reached the conveyance sensor C5 (YES in step S92 of FIG. 31), the process goes on to step S93. In step S93 of FIG. 31, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S93 of FIG. 31), step S93 of FIG. 31 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S93 of FIG. 31), in step S94 of FIG. 31, the controller 500 of the sheet processing device 100 causes the exit roller pair 113 to stop conveying the inner sheet P (cleaning sheet). Next, in step S95 of FIG. 31, the controller 500 of the sheet processing device 100 causes the sheet end detection sensor C10 to detect a correction amount in the main scanning direction of the inner sheet P (cleaning sheet). Next, in step S96 of FIG. 31, the controller 500 of the sheet processing device 100 causes the exit roller pair 113 to move in the main scanning direction. Then in step S97 of FIG. 31, the controller 500 of the sheet processing device 100 determines whether the inner sheet P (cleaning sheet) has been conveyed by a designated amount. When the inner sheet P (cleaning sheet) has not been conveyed by the designated amount, step S97 of FIG. 31 is repeated until the inner sheet P (cleaning sheet) is conveyed by the designated amount. By contrast, when the inner sheet P (cleaning sheet) has been conveyed by the designated amount and adjusted the lateral registration (YES in step S97 of FIG. 31), in step S98 of FIG. 31, the controller 500 of the sheet processing device 100 causes the exit roller pair 113 to stop movement in the main scanning direction (see FIGS. 22A and 22B).

Next, in step S99 of FIG. 31, the controller 500 of the sheet processing device 100 causes the exit roller pair 113 to start conveying the inner sheet P (cleaning sheet). Then in step S100 of FIG. 31, the controller 500 of the sheet processing device 100 determines whether the leading end of the inner sheet P (cleaning sheet) has reached the conveyance sensor C5 based on the detection result of the conveyance sensor C5. When the leading end of the inner sheet P (cleaning sheet) has not reached the conveyance sensor C5 (NO in step S100 of FIG. 31), step S100 of FIG. 31 is repeated until the leading end of the inner sheet P (cleaning sheet) reaches the conveyance sensor C5. By contrast, when the leading end of the inner sheet P (cleaning sheet) has reached the conveyance sensor C5 (YES in step S100 of FIG. 31), the process goes on to step S101. In step S101 of FIG. 31, the controller 500 of the sheet processing device 100 determines whether the inner sheet P (cleaning sheet) has been conveyed by a designated amount from the conveyance sensor C5. When the inner sheet P (cleaning sheet) has not been conveyed by the designated amount from the conveyance sensor C5 (NO in step S101 of FIG. 31), step S101 of FIG. 31 is repeated until the inner sheet P (cleaning sheet) is conveyed by the designated amount from the conveyance sensor C5. By contrast, when the inner sheet P (cleaning sheet) has been conveyed by the designated amount from the conveyance sensor C5 (YES in step S101 of FIG. 31), the process goes on to step S102. Next, in step S102 of FIG. 31, the controller 500 of the sheet processing device 100 causes the branching claw 118 to switch the sheet conveyance passage to the fixing passage 128 in step S102 of FIG. 31. Then, in step S103 of FIG. 31, the controller 500 of the sheet processing device 100 causes the exit roller pair 113 to convey the inner sheet P (cleaning sheet) to the fixing unit including the heat pressing roller 120. In step S104 of FIG. 31, the controller 500 of the sheet processing device 100 determines whether the cleaning operation has reached a designated number of times. When the cleaning operation has reached the designated number of times (YES in step S104 of FIG. 31), the cleaning operation ends. By contrast, when the cleaning operation has not reached the designated number of times (NO in step S104 of FIG. 31), the controller 500 of the sheet processing device 100 returns to the operation flow indicated by [4] in FIG. 31 and repeats the operations after step S81 until the cleaning operation is completed.

As described above, according to the laminating device of the above-described embodiment of the present disclosure, a subsequent cleaning sheet of a plurality of cleaning sheets is conveyed at a position different from a position of a preceding sheet of the plurality of cleaning sheets in the direction orthogonal to the cleaning sheet conveyance direction. As a result, the time and efforts taken to clean the fixing unit are reduced.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. For example, embodiments and variations may be combined with each other. Such variations are not to be regarded as a departure from the scope of the present disclosure and appended claims, and all such modifications are intended to be included within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A laminating device configured to insert a sheet-shaped medium into a two-ply sheet, the laminating device comprising:
   a loader configured to load the sheet-shaped medium or a cleaning sheet;
   a fixing device configured to laminate the two-ply sheet in which the sheet-shaped medium is sandwiched between two sheets of the two-ply sheet; and
   control circuitry configured to clean the fixing device by,
      conveying a plurality of cleaning sheets from the loader, and
      conveying a subsequent cleaning sheet of the plurality of cleaning sheets at a position different from a position of a preceding cleaning sheet of the plurality of cleaning sheets in a direction orthogonal to a conveyance direction of the plurality of cleaning sheets.

2. The laminating device according to claim 1,
   wherein the loader is configured to move the subsequent cleaning sheet to the position different from the position of the preceding cleaning sheet in the direction orthogonal to the conveyance direction before conveyance of the subsequent cleaning sheet.

3. The laminating device according to claim 2, wherein the loader is configured to be manually manipulated to move the subsequent cleaning sheet to the position different from the position of the preceding sheet.

4. The laminating device according to claim 1, further comprising a roller configured to move the subsequent cleaning sheet to the position different from the position of the preceding cleaning sheet in a conveyance passage after the conveyance of the subsequent cleaning sheet.

5. The laminating device according to claim 4, wherein the roller is configured to move in the direction orthogonal to the conveyance direction in the conveyance passage.

6. The laminating device according to claim 1,
   wherein the loader includes a mover configured to move the sheet-shaped medium or the cleaning sheet in the direction orthogonal to the conveyance direction, and
   wherein the control circuitry is configured to cause the mover to automatically move the plurality of cleaning sheets set on the loader to the different position.

7. The laminating device according to claim 1,
   wherein the control circuitry is configured to convey the preceding cleaning sheet and the subsequent cleaning sheet in a range of the fixing device, and
   wherein the range is equal to or larger than a width of the two-ply sheet in the direction orthogonal to the conveyance direction.

8. The laminating device according to claim 1, further comprising a roller configured to feed the cleaning sheet from the loader,
   wherein the control circuitry is configured to cause the roller to feed the cleaning sheet from the loader without a separating operation of the two-ply sheet.

9. The laminating device according to claim 1, further comprising a first detector,
   wherein the loader is configured to load the two-ply sheet, and
   wherein the first detector is configured to detect which of the two-ply sheet or one of the sheet-shaped medium and the cleaning sheet is loaded on the loader.

10. The laminating device according to claim 9, further comprising a separator configured to separate the two-ply sheet,
    wherein the fixing device includes a heat pressing roller disposed downstream from the separator in the conveyance direction and configured to heat and press the two-ply sheet, and
    wherein the first detector is at a position corresponding to an end position of the heat pressing roller and the two-ply sheet in the direction orthogonal to the conveyance direction.

11. The laminating device according to claim 1, further comprising a second detector downstream from the loader in the conveyance direction, the second detector configured to detect a leading end and a trailing end of the two-ply sheet, the sheet-shaped medium, or the cleaning sheet in the conveyance direction.

12. An image forming apparatus comprising the laminating device according to claim 1.

13. An image forming system comprising the laminating device according to claim 1.

14. The laminating device according to claim 1, wherein the two-ply sheet includes the two sheets overlaid and partially bonded to each other.

15. The laminating device according to claim 1, wherein the control circuitry is configured to cause the loader to move the preceding cleaning sheet to a first position at a left of the direction orthogonal to the conveyance direction.

16. The laminating device according to claim 1, wherein the control circuitry is configured to cause the loader to move subsequent cleaning sheet to the different position, the different position being a second position at a right of the direction orthogonal to the conveyance direction.

* * * * *